(12) United States Patent
Tanabe et al.

(10) Patent No.: US 11,354,030 B2
(45) Date of Patent: Jun. 7, 2022

(54) ELECTRONIC DEVICE, CONTROL METHOD, AND PROGRAM

(71) Applicant: KYOCERA Corporation, Kyoto (JP)

(72) Inventors: Shigeki Tanabe, Yokohama (JP); Yasuhiro Ueno, Yokohama (JP); Hideki Morita, Yokohama (JP); Isao Masuike, Machida (JP); Koutaro Yamauchi, Yokohama (JP); Manabu Sakuma, Yokohama (JP); Kenji Shimada, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 16/969,490

(22) PCT Filed: Feb. 4, 2019

(86) PCT No.: PCT/JP2019/003875
§ 371 (c)(1),
(2) Date: Aug. 12, 2020

(87) PCT Pub. No.: WO2019/163503
PCT Pub. Date: Aug. 29, 2019

(65) Prior Publication Data
US 2020/0401291 A1 Dec. 24, 2020

(30) Foreign Application Priority Data

Feb. 22, 2018 (JP) .............................. JP2018-030030
Feb. 22, 2018 (JP) .............................. JP2018-030045

(51) Int. Cl.
*G06F 3/0488* (2022.01)

(52) U.S. Cl.
CPC .................................. *G06F 3/0488* (2013.01)

(58) Field of Classification Search
CPC ...................................................... G06F 3/0488
See application file for complete search history.

(56) References Cited

U.S. PATENT DOCUMENTS

| 8,854,335 | B2 * | 10/2014 | Chang ................... | G06F 3/0421 |
| | | | | 345/174 |
| 8,928,700 | B1 * | 1/2015 | Khafizova ............. | G06F 3/0412 |
| | | | | 345/661 |
| 8,941,648 | B2 * | 1/2015 | Joung ................ | H04N 1/00448 |
| | | | | 345/419 |
| 9,191,473 | B2 * | 11/2015 | Shimada ............. | G06F 3/04886 |
| 9,880,701 | B2 * | 1/2018 | Hyun .................. | G06F 3/04817 |

(Continued)

FOREIGN PATENT DOCUMENTS

| CN | 102023791 A | * | 4/2011 | ........... G06F 3/0485 |
| JP | 2012133525 A | | 7/2012 | |

(Continued)

*Primary Examiner* — Shen Shiau
(74) *Attorney, Agent, or Firm* — Studebaker & Brackett PC

(57) ABSTRACT

An electronic device includes a sensor configured to detect a gesture that does not come into contact with the electronic device, a touch sensor, a display configured to display a first screen and a second screen, and a controller configured to associate the gesture detected by the sensor with an operation of the first screen and a touch detected by the touch sensor with an operation of the second screen in accordance with a position where the sensor is disposed.

5 Claims, 30 Drawing Sheets

(56) References Cited

U.S. PATENT DOCUMENTS

| | | | |
|---|---|---|---|
| 9,946,373 B2* | 4/2018 | Graf | G06F 3/041 |
| 10,037,083 B2 | 7/2018 | Nii | |
| 10,184,856 B2* | 1/2019 | Ueno | G01B 21/18 |
| 10,228,849 B2* | 3/2019 | Keam | G06F 3/1423 |
| 10,254,863 B2* | 4/2019 | Shin | G06F 1/1677 |
| 10,261,746 B2* | 4/2019 | Masuike | G06F 21/31 |
| 10,298,732 B2* | 5/2019 | Tanabe | H04M 1/605 |
| 10,467,017 B2* | 11/2019 | Klein | G06F 9/4401 |
| 10,536,571 B2* | 1/2020 | Tanabe | G06F 3/0304 |
| 10,606,361 B2* | 3/2020 | Tanabe | G06F 3/0304 |
| 10,613,638 B2* | 4/2020 | Tanabe | G06F 3/0346 |
| 10,698,541 B2* | 6/2020 | Tanabe | G06F 3/04883 |
| 10,860,274 B2* | 12/2020 | Son | G06F 3/1423 |
| 10,955,927 B2* | 3/2021 | Ueno | G06F 3/017 |
| 11,054,911 B2* | 7/2021 | Ueno | G06F 1/325 |
| 11,079,995 B1* | 8/2021 | Hulbert | G06F 3/0485 |
| 2006/0267959 A1* | 11/2006 | Goto | G06F 3/0488 |
| | | | 345/173 |
| 2007/0078599 A1* | 4/2007 | Yoshioka | G09B 29/102 |
| | | | 701/454 |
| 2007/0083325 A1* | 4/2007 | Baba | G06F 3/04883 |
| | | | 701/457 |
| 2007/0109323 A1* | 5/2007 | Nakashima | G09G 5/14 |
| | | | 345/661 |
| 2009/0289914 A1* | 11/2009 | Cho | G06F 3/0393 |
| | | | 345/173 |
| 2009/0322497 A1* | 12/2009 | Ku | G06F 3/0416 |
| | | | 340/407.2 |
| 2010/0097310 A1* | 4/2010 | Lee | H04N 1/00427 |
| | | | 345/156 |
| 2010/0293502 A1* | 11/2010 | Kang | G09G 3/003 |
| | | | 715/803 |
| 2011/0050629 A1* | 3/2011 | Homma | G06F 3/0485 |
| | | | 345/174 |
| 2011/0096024 A1* | 4/2011 | Kwak | G06F 3/0445 |
| | | | 345/174 |
| 2011/0136479 A1* | 6/2011 | Kim | H04M 1/6016 |
| | | | 455/418 |
| 2011/0157078 A1* | 6/2011 | Miyazawa | G06F 3/0446 |
| | | | 345/174 |
| 2011/0164060 A1* | 7/2011 | Miyazawa | G06F 3/0488 |
| | | | 345/660 |
| 2011/0164063 A1* | 7/2011 | Shimotani | G06F 3/0416 |
| | | | 345/661 |
| 2011/0175830 A1* | 7/2011 | Miyazawa | G06F 1/1647 |
| | | | 345/173 |
| 2011/0209102 A1* | 8/2011 | Hinckley | G06F 3/1446 |
| | | | 715/863 |
| 2011/0227948 A1* | 9/2011 | Ushida | G01C 21/367 |
| | | | 345/173 |
| 2011/0268218 A1* | 11/2011 | Kang | H04N 21/482 |
| | | | 375/295 |
| 2012/0050180 A1* | 3/2012 | King | G06F 3/04166 |
| | | | 345/173 |
| 2012/0078513 A1* | 3/2012 | Oaki | G01C 21/3664 |
| | | | 701/527 |
| 2012/0081278 A1* | 4/2012 | Freedman | G06F 3/04886 |
| | | | 345/156 |
| 2012/0154305 A1* | 6/2012 | Nunomaki | G06F 3/04883 |
| | | | 345/173 |
| 2012/0242599 A1* | 9/2012 | Seo | G06F 3/1423 |
| | | | 345/173 |
| 2012/0274541 A1* | 11/2012 | Inami | G06F 1/1641 |
| | | | 345/1.3 |
| 2012/0299849 A1* | 11/2012 | Homma | G06F 3/0488 |
| | | | 345/173 |
| 2013/0083074 A1* | 4/2013 | Nurmi | G06F 3/0488 |
| | | | 345/650 |
| 2013/0132908 A1* | 5/2013 | Lee | G06F 3/04817 |
| | | | 715/764 |
| 2013/0181945 A1 | 7/2013 | Hasui | |
| 2013/0222276 A1* | 8/2013 | Kim | G06F 3/0488 |
| | | | 345/173 |
| 2013/0222329 A1* | 8/2013 | Larsby | G06F 3/04886 |
| | | | 345/174 |
| 2014/0101575 A1* | 4/2014 | Kwak | G06F 3/0486 |
| | | | 715/761 |
| 2014/0101578 A1* | 4/2014 | Kwak | G06F 1/1647 |
| | | | 715/761 |
| 2014/0137032 A1* | 5/2014 | Won | G06F 3/0485 |
| | | | 715/784 |
| 2014/0152576 A1* | 6/2014 | Kim | G06F 3/0416 |
| | | | 345/169 |
| 2014/0157125 A1* | 6/2014 | Seo | G06F 3/165 |
| | | | 715/716 |
| 2014/0184530 A1* | 7/2014 | Hyun | G06F 1/1643 |
| | | | 345/173 |
| 2014/0210740 A1* | 7/2014 | Lee | G06F 1/1688 |
| | | | 345/173 |
| 2014/0225860 A1* | 8/2014 | Aono | G06F 3/04886 |
| | | | 345/174 |
| 2014/0259029 A1* | 9/2014 | Choi | G06F 3/04886 |
| | | | 719/318 |
| 2014/0267094 A1* | 9/2014 | Hwang | G06F 3/04883 |
| | | | 345/173 |
| 2014/0267131 A1* | 9/2014 | Elia | G06F 3/044 |
| | | | 345/174 |
| 2015/0042580 A1* | 2/2015 | Shim | G06F 3/042 |
| | | | 345/173 |
| 2015/0116362 A1* | 4/2015 | Aurongzeb | G06F 1/1677 |
| | | | 345/650 |
| 2015/0153887 A1* | 6/2015 | Kim | G06F 3/0446 |
| | | | 345/173 |
| 2015/0199125 A1* | 7/2015 | Tsukamoto | G06F 3/04817 |
| | | | 715/765 |
| 2015/0212611 A1* | 7/2015 | Takeda | G06F 3/0484 |
| | | | 345/173 |
| 2015/0220299 A1* | 8/2015 | Kim | G06F 3/013 |
| | | | 345/1.3 |
| 2015/0309704 A1* | 10/2015 | Bae | G06F 1/1677 |
| | | | 715/765 |
| 2015/0324162 A1* | 11/2015 | Kim | G06F 1/1643 |
| | | | 345/169 |
| 2015/0338888 A1* | 11/2015 | Kim | G06F 3/0488 |
| | | | 345/156 |
| 2015/0346831 A1 | 12/2015 | Nii | |
| 2015/0356160 A1* | 12/2015 | Berwick | G06F 3/04817 |
| | | | 715/781 |
| 2016/0105542 A1* | 4/2016 | Lee | G06F 1/1652 |
| | | | 455/566 |
| 2016/0147388 A1 | 5/2016 | Shin et al. | |
| 2016/0288643 A1* | 10/2016 | Kotter | G06F 3/0488 |
| 2016/0291794 A1* | 10/2016 | Kawamura | G06F 3/0488 |
| 2016/0313912 A1* | 10/2016 | Keam | G06F 3/04886 |
| 2017/0068381 A1* | 3/2017 | Choi | G06F 1/1641 |
| 2017/0102777 A1* | 4/2017 | Kato | G06F 3/01 |
| 2017/0115793 A1* | 4/2017 | Namgoong | G06F 3/0414 |
| 2017/0357473 A1* | 12/2017 | Kim | G06F 3/04883 |
| 2018/0011630 A1* | 1/2018 | Kim | G06F 3/0482 |
| 2018/0032140 A1* | 2/2018 | Tanabe | G06F 3/017 |
| 2018/0032141 A1* | 2/2018 | Tanabe | G06F 3/017 |
| 2018/0034950 A1* | 2/2018 | Tanabe | H04W 52/0254 |
| 2018/0061243 A1* | 3/2018 | Shloosh | G08G 5/0043 |
| 2018/0081613 A1* | 3/2018 | Masuike | G06F 21/31 |
| 2018/0129262 A1* | 5/2018 | Veiga | G06F 1/1681 |
| 2018/0359350 A1* | 12/2018 | Kim | H04M 1/0214 |
| 2018/0373408 A1* | 12/2018 | Lee | G06F 1/165 |
| 2019/0034001 A1* | 1/2019 | Tanabe | G06F 3/0304 |
| 2019/0034073 A1* | 1/2019 | Shi | H04M 1/72403 |
| 2019/0042066 A1* | 2/2019 | Kim | G06F 3/0482 |
| 2019/0215392 A1* | 7/2019 | Tanabe | H04M 1/724 |
| 2019/0339785 A1* | 11/2019 | Ueno | G06F 3/01 |
| 2019/0354190 A1* | 11/2019 | Ueno | G06F 3/14 |
| 2020/0033959 A1* | 1/2020 | Tanabe | G06F 1/1626 |
| 2020/0034032 A1* | 1/2020 | Tanabe | G06F 3/04845 |
| 2020/0066272 A1* | 2/2020 | Tanabe | G06F 3/04883 |
| 2020/0066273 A1* | 2/2020 | Tanabe | G06F 3/167 |
| 2020/0073479 A1* | 3/2020 | Ueno | G06F 3/0304 |

(56) References Cited

U.S. PATENT DOCUMENTS

| | | | |
|---|---|---|---|
| 2020/0125178 A1* | 4/2020 | Ueno | G06F 1/3212 |
| 2020/0183524 A1* | 6/2020 | Shimada | G06F 3/0412 |
| 2020/0249898 A1* | 8/2020 | Ko | G09G 3/20 |
| 2020/0333947 A1* | 10/2020 | Tanabe | B60K 35/00 |
| 2020/0333948 A1* | 10/2020 | Tanabe | G06F 3/0488 |
| 2020/0358896 A1* | 11/2020 | Kwon | H04B 1/3888 |
| 2020/0371597 A1* | 11/2020 | Ueno | G06K 9/00355 |
| 2020/0371601 A1* | 11/2020 | Iio | B60K 37/02 |

FOREIGN PATENT DOCUMENTS

| | | | |
|---|---|---|---|
| JP | 2012155545 A | 8/2012 | |
| JP | 2013012150 A | 1/2013 | |
| JP | 2015014932 A | 1/2015 | |
| JP | 2015225493 A | 12/2015 | |
| JP | 2018018289 A | 2/2018 | |
| WO | 2012039301 A1 | 3/2012 | |

\* cited by examiner

FIG. 26
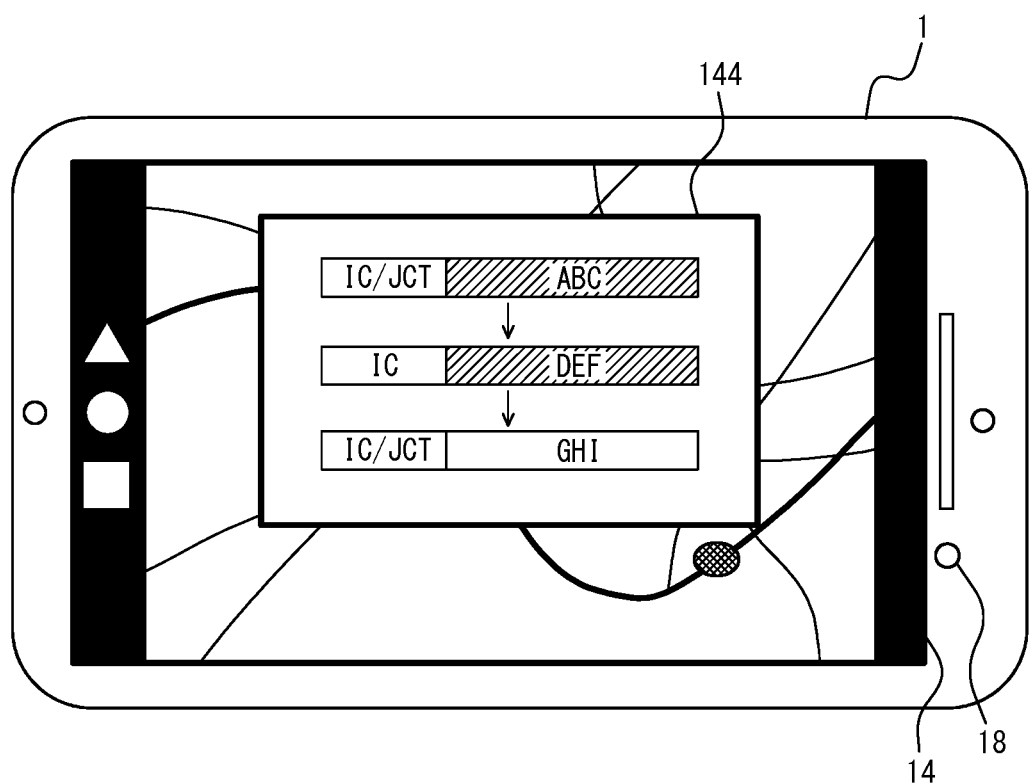
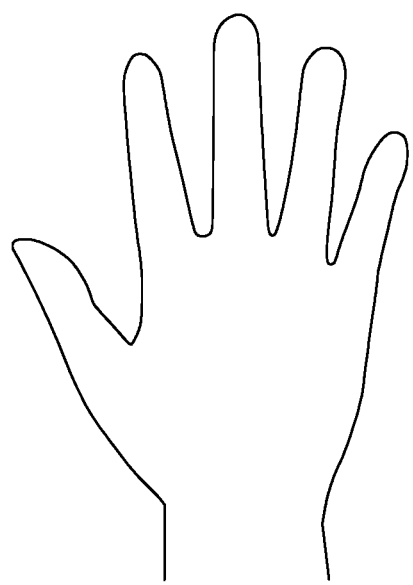

ELECTRONIC DEVICE, CONTROL METHOD, AND PROGRAM

CROSS-REFERENCE TO RELATED APPLICATIONS

The present application claims priority to and the benefit of Japanese Patent Application Nos. 2018-030030 and 2018-030045 filed Feb. 22, 2018, the entire contents of which are incorporated herein by reference.

TECHNICAL FIELD

The present disclosure relates to an electronic device, a control method, and a program.

BACKGROUND

Electronic devices, such as smartphones and tablets, typically include a touch panel. A user typically controls such an electronic device by touching the touch panel. An electronic device that, for example, detects a gesture, performed by the user at a distance from the electronic device, using a proximity sensor such as an infrared sensor and then processes an input operation in response to the gesture has been proposed in recent years. For example, see patent literature (PTL) 1.

CITATION LIST

Patent Literature

PTL 1: JP2015-225493A

SUMMARY

An electronic device of the present disclosure includes a sensor configured to detect a gesture that does not come into contact with the electronic device, a touch sensor, a display configured to display a first screen and a second screen, and a controller configured to associate the gesture detected by the sensor with an operation of the first screen and a touch detected by the touch sensor with an operation of the second screen in accordance with a position where the sensor is disposed.

A control method of the present disclosure is a control method of an electronic device including a sensor configured to detect a gesture that does not come into contact with the electronic device, a touch sensor, and a display configured to display a first screen and a second screen. The control method includes associating the gesture detected by the sensor with an operation of the first screen and a touch detected by the touch sensor with an operation of the second screen in accordance with a position where the sensor is disposed.

A program of the present disclosure is a program for an electronic device including a sensor configured to detect a gesture that does not come into contact with the electronic device, a touch sensor, and a display configured to display a first screen and a second screen. The program causes the electronic device to associate the gesture detected by the sensor with an operation of the first screen and a touch detected by the touch sensor with an operation of the second screen in accordance with a position where the sensor is disposed.

An electronic device of the present disclosure includes a sensor configured to detect a gesture that does not come into contact with the electronic device, a touch sensor, and a controller configured to set a screen movement amount per basic operation based on the gesture detected by the sensor to be greater than a screen movement amount per basic operation based on a touch detected by the touch sensor.

An electronic device of the present disclosure includes a sensor configured to detect a gesture that does not come into contact with the electronic device, a touch sensor, and a controller configured to set a screen movement amount based on first information associated with the gesture detected by the sensor and a screen movement amount based on second information associated with a touch detected by the touch sensor to differ.

A control method of the present disclosure is a control method for an electronic device including a sensor configured to detect a gesture that does not come into contact with the electronic device and a touch sensor. The control method includes setting a screen movement amount per basic operation based on the gesture detected by the sensor to be greater than a screen movement amount per basic operation based on a touch detected by the touch sensor.

A control method of the present disclosure is a control method for an electronic device including a sensor configured to detect a gesture that does not come into contact with the electronic device and a touch sensor. The control method includes setting a screen movement amount based on first information associated with the gesture detected by the sensor and a screen movement amount based on second information associated with a touch detected by the touch sensor to differ.

A program of the present disclosure is a program for an electronic device including a sensor configured to detect a gesture that does not come into contact with the electronic device and a touch sensor. The program causes the electronic device to set a screen movement amount per basic operation based on the gesture detected by the sensor to be greater than a screen movement amount per basic operation based on a touch detected by the touch sensor.

A program of the present disclosure is a program for an electronic device including a sensor configured to detect a gesture that does not come into contact with the electronic device and a touch sensor. The program causes the electronic device to set a screen movement amount based on first information associated with the gesture detected by the sensor and a screen movement amount based on second information associated with a touch detected by the touch sensor to differ.

BRIEF DESCRIPTION OF THE DRAWINGS

In the accompanying drawings:

FIG. 26 illustrates an example of gesture-based operation;

DETAILED DESCRIPTION

An electronic device may include a touch panel and also detect a gesture, performed by the user at a distance from the electronic device, using a proximity sensor, and then process an input operation in response to the gesture. On such an electronic device, an operation to scroll the screen, for example, can be performed with a gesture that does not come into contact with the touch panel. When the user's hand is dirty, for example, the user can scroll the screen without touching the touch panel by enabling gesture-based input operations.

In an electronic device that displays a plurality of screens on a touch panel display, more operations than in a known configuration can be performed, such as operations of each screen, switching between screens, and changing the position of a screen. A variety of input corresponding to numerous operations is desired to improve the operability of such an electronic device.

When an electronic device includes a function to display information, the user may, for example, wish to customize the scroll amount or the like. Settings can typically be made on a menu screen provided in the electronic device. Passing through layers of items to make a selection is cumbersome for the user, however, and simultaneous use of a plurality of scroll amounts is not supported. A variety of input corresponding to different movement amounts is desired to improve the operability of such an electronic device.

The present disclosure relates to providing an electronic device, a control method, and a program that have improved operability with regard to input operations. Embodiments of the present disclosure can provide an electronic device, a control method, and a program that have improved operability with regard to input operations.

(Electronic Device Configuration)

Figure 1:
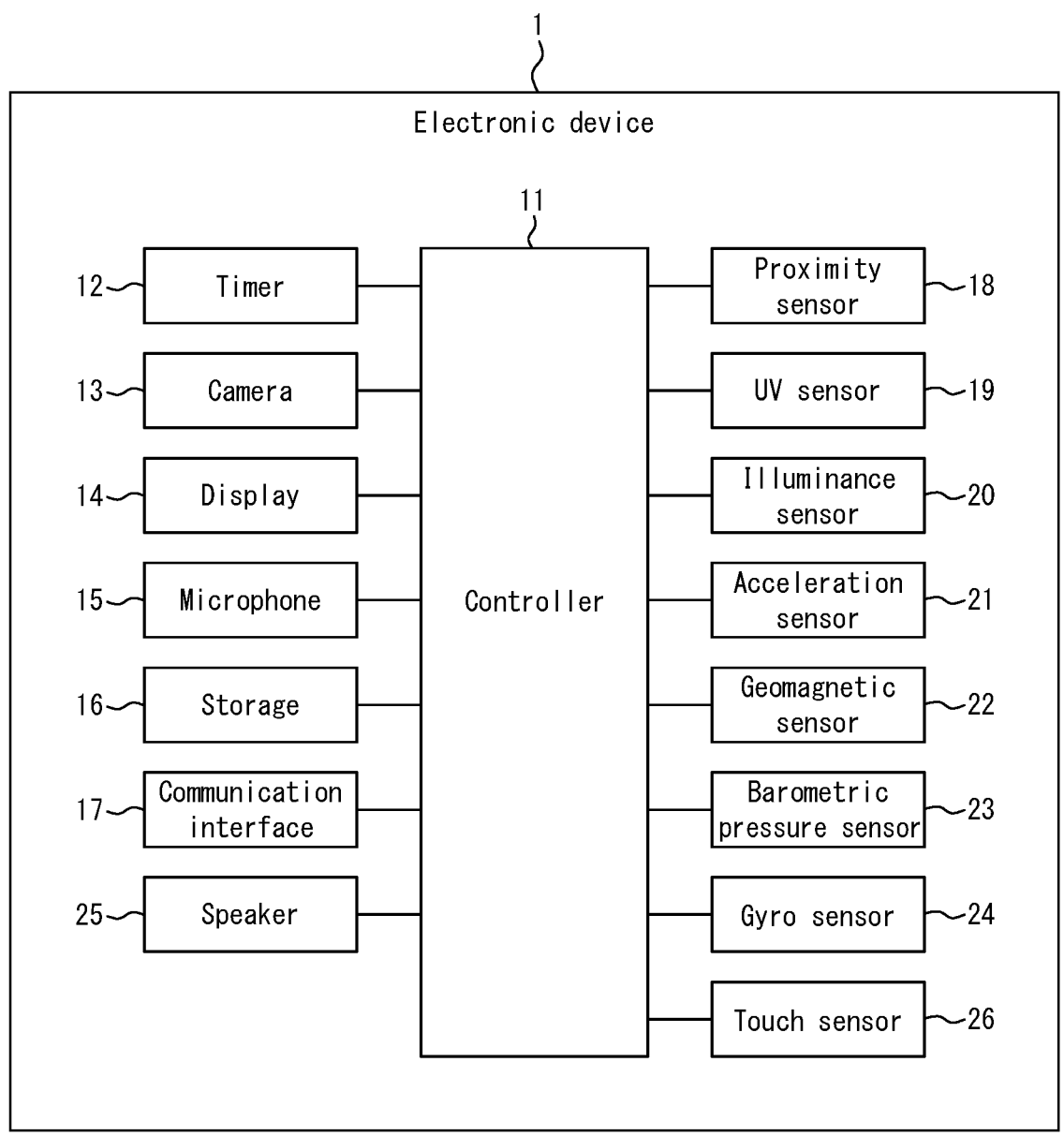
FIG. 1 illustrates the schematic configuration of an electronic device according to an embodiment.

An electronic device 1 according to an embodiment includes a proximity sensor 18 (gesture sensor), a touch sensor 26, and a controller 11, as illustrated in FIG. 1. The electronic device 1 also includes a timer 12, camera 13, a display 14, a microphone 15, a storage 16, a communication interface 17, and a speaker 25. The electronic device 1 further includes a UV sensor 19, an illuminance sensor 20, an acceleration sensor 21, a geomagnetic sensor 22, a barometric pressure sensor 23, and a gyro sensor 24. FIG. 1 is only an example, and the electronic device 1 need not include all of the components in FIG. 1. Also, the electronic device 1 may include components other than those illustrated in FIG. 1.

The timer 12 receives an instruction for a timer operation from the controller 11. Once a predetermined time has elapsed, the timer 12 outputs a signal indicating that the predetermined time has elapsed to the controller 11. The timer 12 may be provided independently from the controller 11, as illustrated in FIG. 1, or be internal to the controller 11.

The camera 13 captures images of subjects around the electronic device 1. One example of the camera 13 is a front camera provided on the same face as the display 14 of the electronic device 1. Another example of the camera 13 is a back camera provided on the back surface of the housing of the electronic device 1 (the opposite surface from the surface where the display 14 is provided). The camera 13 may include a front camera and a back camera.

The display 14 displays screens. The screen includes, for example, at least one of characters, images, symbols, graphics, and the like. The display 14 may be a liquid crystal display. The display 14 may be an organic electro-luminescence (EL) panel, an inorganic EL panel, or the like. In the present embodiment, the display 14 is a touch panel display (touchscreen display) integrated with the touch sensor 26.

The microphone 15 detects sound around the electronic device 1, including people's voices.

The storage 16 functions as a memory storing programs and data. The storage 16 temporarily stores the processing results of the controller 11. The storage 16 may include any appropriate storage device, such as a semiconductor storage device or a magnetic storage device. The storage 16 may also include a plurality of types of storage devices. The storage 16 may include a combination of a portable storage medium, such as a memory card, and an apparatus for reading the storage medium.

The programs stored in the storage 16 include applications that run in the foreground or the background and a control program that supports operations of the applications. For example, the applications cause the controller 11 to execute processing corresponding to a gesture. The control program is, for example, an operating system (OS). The applications and control program may be installed on the storage 16 by communication through the communication interface 17 or from a storage medium. The data stored in the storage 16 includes various types of information, such as still images (photographs), videos, maps, information of highway interchanges (ICs) or the like, and traffic information. For example, the maps and the traffic information can be acquired and updated via the communication interface 17.

The communication interface 17 is for communicating over a wired or wireless connection. The communication method of the communication interface 17 in an embodiment is prescribed by a wireless communication standard. For example, wireless communication standards include cellular phone communication standards such as 2G, 3G, or 4G. Examples of cellular phone communication standards include Long Term Evolution (LTE) and Wideband Code Division Multiple Access (W-CDMA). Examples of cellular phone communication standards also include Code Division Multiple Access (CDMA) 2000 and Personal Digital Cellular (PDC). Examples of cellular phone communication standards further include Global System for Mobile communications (GSM®) (GSM is a registered trademark in Japan, other countries, or both) and Personal Handy-phone System (PHS). Examples of wireless communication standard include Worldwide Interoperability for Microwave Access (WiMAX), IEEE802.11, and Bluetooth® (Bluetooth is a registered trademark in Japan, other countries, or both). Examples of wireless communication standards also include Infrared Data Association (IrDA) and Near Field Communication (NFC). The communication interface 17 may support one or more of the aforementioned communication standards.

The speaker 25 outputs sound. When the electronic device 1 is a device capable of phone calls, then during a phone call, the speaker 25 outputs the other party's voice, for example. When, for example, the news, the weather forecast, or the like is read aloud, the speaker 25 outputs the corresponding sound.

Without contact, the proximity sensor 18 detects the relative distance to an object near the electronic device 1, the movement direction of the object, and the like. In the present embodiment, the proximity sensor 18 includes one infrared light emitting diode (LED) acting as a light source and four infrared photodiodes. The proximity sensor 18 emits infrared light, from the infrared LED acting as a light source, towards an object. Reflected light from the object is incident on the infrared photodiodes of the proximity sensor 18. The proximity sensor 18 can measure the relative distance to the object on the basis of the output current of the infrared photodiodes. The proximity sensor 18 also detects the movement direction of the object by the difference in time at which reflected light from the object is incident on each of the infrared photodiodes. The proximity sensor 18 can thus detect an operation by an air gesture (gesture) that the user of the electronic device 1 performs without touching the electronic device 1. The proximity sensor 18 may include visible light photodiodes.

The touch sensor 26 is a sensor that detects contact by a finger of the user, a stylus, or other object and identifies the contact position. As described above, the touch sensor 26 is integrated with the display 14 in the present embodiment to constitute a touch panel display. The touch sensor 26 can simultaneously detect a plurality of positions contacted by fingers, styli, or the like.

The controller 11 is a processor such as a central processing unit (CPU). The controller 11 may be a system-on-a-chip (SoC) or other type of integrated circuit in which other components are integrated. The controller 11 may be configured by combining a plurality of integrated circuits. The controller 11 implements a variety of functions by controlling overall operation of the electronic device 1. When the electronic device 1 is an apparatus constituting a car navigation system mounted in a vehicle, the controller 11 may be a CPU and form an electronic control unit (ECU) together with the communication interface 17 and the storage 16.

Specifically, the controller 11 refers as necessary to data stored in the storage 16. The controller 11 implements a variety of functions by executing instructions included in programs stored in the storage 16 to control other functional components, such as the display 14. The controller 11 acquires data indicating contact by the user from the touch sensor 26, for example. The controller 11 acquires information on a user gesture detected by the proximity sensor 18, for example. The controller 11 also recognizes the running status of an application, for example.

The UV sensor 19 can measure the amount of ultraviolet light included in sunlight or other light.

The illuminance sensor 20 detects the illuminance from surrounding light that is incident on the illuminance sensor 20. A photodiode, for example, may be used in the illuminance sensor 20. A phototransistor, for example, may be used in the illuminance sensor 20.

The acceleration sensor 21 detects the direction and magnitude of acceleration acting on the electronic device 1. The acceleration sensor 21 outputs information of the detected acceleration as an output signal. The acceleration sensor 21 is, for example, a three-axis (three-dimensional) sensor that detects acceleration in the x-axis, y-axis, and z-axis directions. The acceleration sensor 21 may, for example, be a piezoresistive type. Alternatively, the acceleration sensor 21 may be a capacitive type, for example.

The geomagnetic sensor 22 enables measurement of the orientation of the electronic device 1 by detecting the orientation of the earth's magnetic field.

The barometric pressure sensor 23 detects the barometric pressure (atmospheric pressure) outside of the electronic device 1.

The gyro sensor 24 detects the angular velocity of the electronic device 1. The controller 11 can measure the change in orientation of the electronic device 1 by integrating the angular velocity, acquired by the gyro sensor 24, over time.

(Gesture-Based Operation of Electronic Device)

Figure 2:
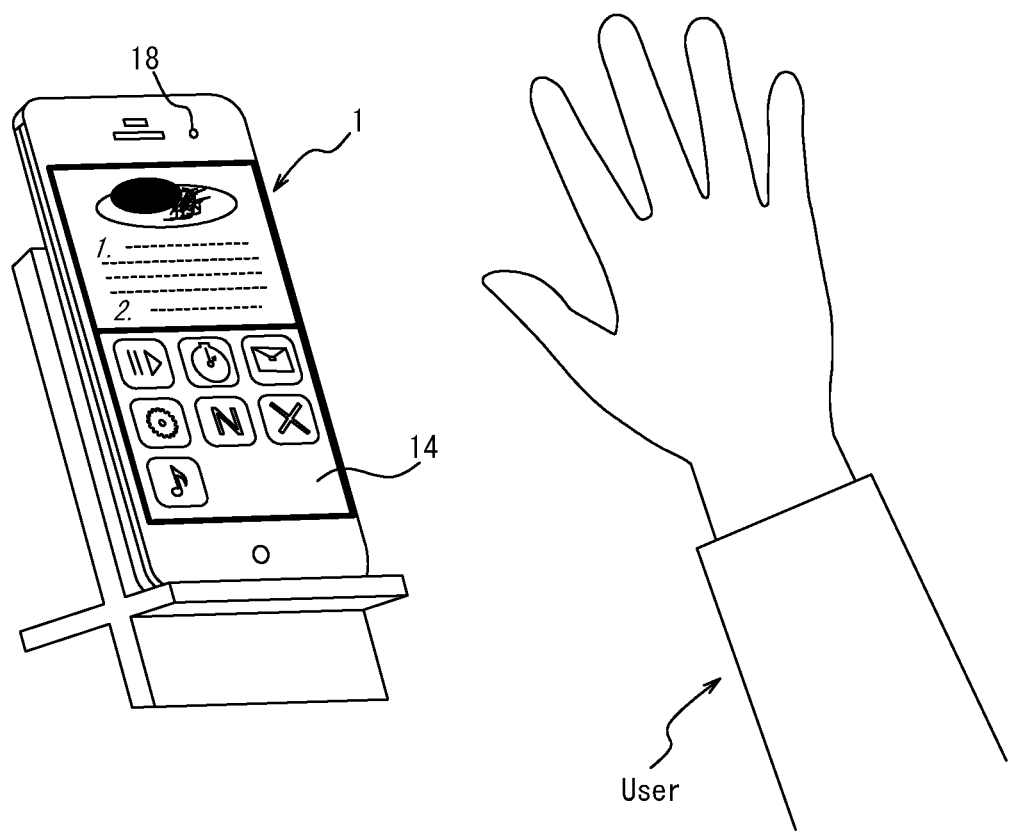
FIG. 2 illustrates a user operating an electronic device with a gesture.

FIG. 2 illustrates the user operating the electronic device 1 with a gesture. In FIG. 2, the electronic device 1 is supported by a stand as an example. Alternatively, the electronic device 1 may be leaned against a wall or placed on a table. Upon the proximity sensor 18 detecting a gesture by the user, the controller 11 executes processing based on the detected gesture. In the example in FIG. 2, the processing in response to the gesture is scrolling of the screen displaying a recipe. For example, when the user makes a gesture by moving a hand upward in the longitudinal direction of the electronic device 1, the screen scrolls upward in accordance with the movement of the user's hand. When the user makes a gesture by moving a hand downward in the longitudinal direction of the electronic device 1, the screen scrolls downward in accordance with the movement of the user's hand. Here, instead of gesture detection by the proximity sensor 18, the controller 11 may perform gesture detection based on an image captured by the camera 13.

In the example in FIG. 2, the screen is split in two. In the example in FIG. 2, a recipe is displayed on the upper one of the two screens, and the screen can be scrolled with a gesture, as described above. A home screen on which a plurality of icons are arranged is displayed on the lower one of the two screens. The user can launch an application associated with an icon on the lower screen by touching the icon. In the present disclosure, a touch operation (contact operation) by the user on the touch panel display is simply referred to as a touch. The touch encompasses various actions, such as a tap, double tap, long tap (press and hold), slide, and the like.

The electronic device 1 in FIG. 2 is a smartphone. Alternatively, the electronic device 1 may, for example, be a mobile phone, a phablet, a tablet personal computer (PC), a feature phone, or the like. The electronic device 1 is not limited to these examples and may, for example, also be a personal digital assistant (PDA), a remote control, a portable music player, a game device, an electronic book reader, a car navigation device, a household appliance, an industrial device (factory automation (FA) device), or the like.

(Gesture Detection Method Using Proximity Sensor)

Figure 3:
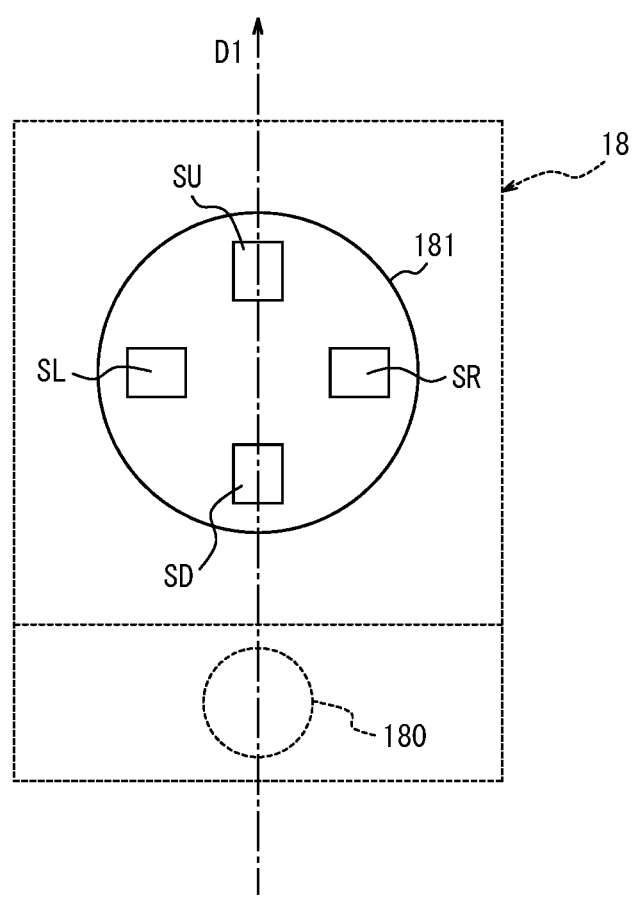
FIG. 3 is a configuration diagram of a proximity sensor.

A method performed by the controller 11 to detect a gesture by the user based on output of the proximity sensor 18 is described below in detail with reference to FIGS. 3 and 4. FIG. 3 illustrates an example configuration of the proximity sensor 18 when the electronic device 1 is viewed from the front. The proximity sensor 18 includes an infrared LED 180 used as a light source and four infrared photodiodes SU, SR, SD, and SL. The four infrared photodiodes SU, SR, SD, and SL detect reflected light from a detection target through a lens 181. The four infrared photodiodes SU, SR, SD, and SL are arranged symmetrically around the center of the lens 181. The imaginary line D1 illustrated in FIG. 3 is substantially parallel to the longitudinal direction of the electronic device 1. The infrared photodiode SU and the infrared photodiode SD are placed apart on the imaginary line D1 in FIG. 3. The infrared photodiodes SR and SL are placed between the infrared photodiode SU and the infrared photodiode SD in the direction of the imaginary line D1 in FIG. 3.

Figure 4:
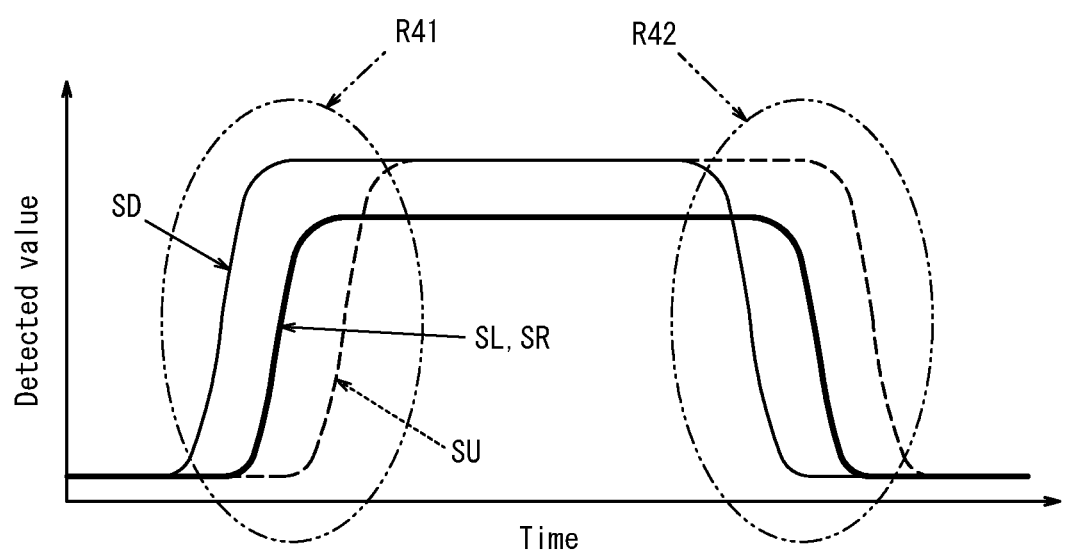
FIG. 4 illustrates the change over time in the value detected by each infrared photodiode.

FIG. 4 illustrates the change over time in the value detected by the four infrared photodiodes SU, SR, SD, and SL when the detection target (for example, the user's hand) moves in the direction of the imaginary line D1 in FIG. 3. The infrared photodiode SU and the infrared photodiode SD are separated the most in the direction of the imaginary line D1. Hence, as illustrated in FIG. 4, the time difference is greatest between the change (for example, increase) in the value detected by the infrared photodiode SU (dashed line) and the same change (for example, increase) in the value detected by the infrared photodiode SD (thin, solid line). By recognizing a predetermined time difference in the change in the values detected by the infrared photodiodes SU, SR, SD, and SL, the controller 11 can judge the movement direction of the detection target.

The controller 11 acquires the values detected by the infrared photodiodes SU, SR, SD, and SL from the proximity sensor 18. To recognize movement by the detection target in the direction of the imaginary line D1, for example, the controller 11 may integrate the result of subtracting the value detected by the photodiode SU from the value detected by the photodiode SD over a predetermined time. In the example in FIG. 4, the integral value in regions R41 and R42 is non-zero. From the change in the integral value (for example, a positive, zero, or negative change), the controller 11 can recognize movement of the detection target in the direction of the imaginary line D1.

The controller 11 may also integrate the result of subtracting the value detected by the photodiode SR from the value detected by the photodiode SL over a predetermined time. From the change in the integral value (for example, a positive, zero, or negative change), the controller 11 can recognize movement of the detection target in a direction orthogonal to the imaginary line D1 (a direction substantially parallel to the transverse direction of the electronic device 1).

Alternatively, the controller 11 may perform calculations using all of the detected values of the photodiodes SU, SR, SD, SL. In other words, the controller 11 may recognize the movement direction of the detection target without performing calculations to divide the movement direction into components in the longitudinal direction and the transverse direction of the electronic device 1.

The gesture detected by the proximity sensor 18 may be a left or right gesture, an up or down gesture, a diagonal gesture, a gesture to trace a circle clockwise, a gesture to trace a circle counterclockwise, or other such gesture. For example, the left or right gesture is performed in a direction substantially parallel to the transverse direction of the electronic device 1. The up or down gesture is performed in a direction substantially parallel to the longitudinal direction of the electronic device 1. The diagonal gesture is performed in a plane substantially parallel to the electronic device 1 in a direction not parallel to either the longitudinal direction or the transverse direction of the electronic device 1.

(Kitchen Mode)

Figure 5:
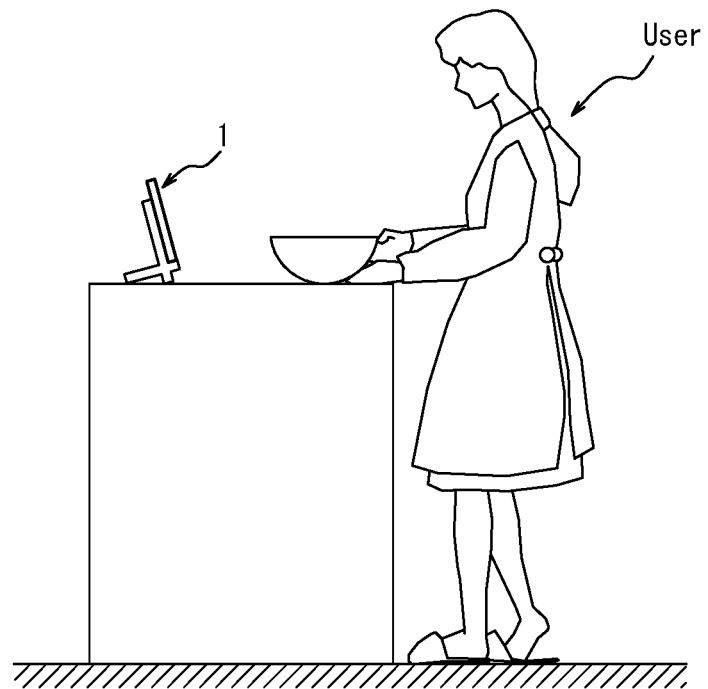
FIG. 5 illustrates an example of conditions in which an electronic device is operated with a gesture.

FIG. 5 illustrates example conditions in which the user operates the electronic device 1 with a gesture. In the example in FIG. 5, the user is cooking in the kitchen by following a cooking recipe displayed on the display 14 of the electronic device 1. The proximity sensor 18 detects a gesture by the user in the example in FIG. 5. The controller 11 executes processing based on the gesture detected by the proximity sensor 18. For example, the controller 11 can execute processing to scroll the recipe in response to a particular gesture (such as the user moving the hand up or down). The user's hand may become dirty or wet during cooking. The user can scroll the recipe, however, without touching the electronic device 1. The display 14 therefore does not become dirty, and dirt on the display 14 can be prevented from getting on the user's hand during cooking.

The electronic device 1 has a plurality of modes. Modes refer to operation modes (operating states or operation statuses) that, for example, place restrictions on the operations of the entire electronic device 1. Only one mode can be selected at a time. In the present embodiment, the modes of the electronic device 1 include at least a first mode, a second mode, and a third mode. The first mode is a regular operation mode (regular mode). The second mode is an operation mode (kitchen mode) of the electronic device 1 that is optimal for cooking in the kitchen while a recipe is displayed. The third mode is an operation mode (car mode) of the electronic device 1 optimal for when the electronic device 1 is installed in a moveable body, in particular a vehicle, and provides various information (for example, information useful for driving or steering, such as maps). As described above, operations can be performed by gestures in the second mode. As described below, operations can also be performed by gestures in the third mode. The moveable body referred to here may, for example, encompass vehicles, ships, aircraft, and the like. The vehicles may, for example, include electric cars, hybrid electric cars, gasoline cars, motorcycles, bicycles, welfare vehicles, and the like. The vehicles may include railway vehicles. The moveable body may be driven or piloted by the user. At least a portion of user operations related to driving or piloting of the moveable body may be automated.

(Car Mode)

Figure 6:
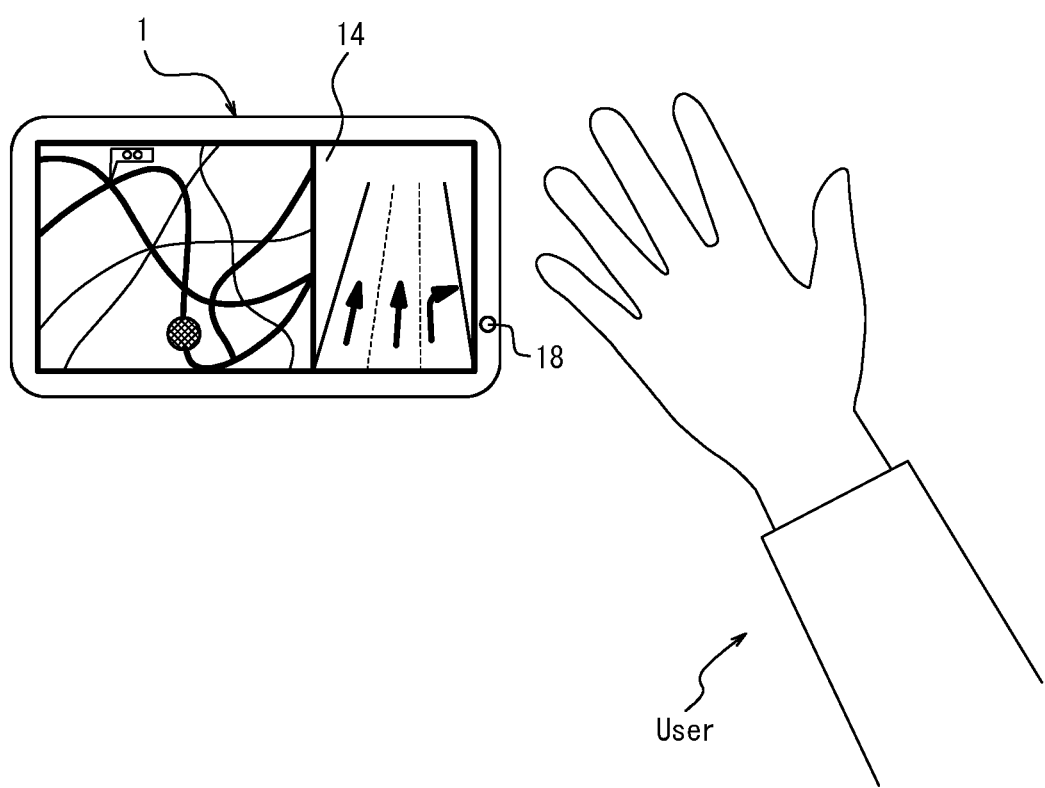
FIG. 6 illustrates a user operating an electronic device with a gesture.

FIG. 6 illustrates the user operating the electronic device 1 with a gesture while the electronic device 1 is in car mode. In FIG. 6, the electronic device 1 is attached to the console of the car, for example. Alternatively, the electronic device 1 may be supported by a support provided inside the car. The support may be installed above the dashboard. As illustrated in FIG. 6, the electronic device 1 in car mode may be used while positioned sideways (so that the longitudinal direction is in the left-right direction). Upon the proximity sensor 18 detecting a gesture by the user, the controller 11 executes processing based on the detected gesture. In the example in FIG. 6, the gesture-based processing is movement of a screen on which a wide area map is displayed. When the user makes a gesture by moving a hand to the left in the longitudinal direction of the electronic device 1, for example, the screen moves to the left in accordance with the movement of the user's hand. The correspondence between the direction of the gesture by which the user moves the hand and the direction in which the screen moves can be set freely. For example, the screen may move to the right instead of to the left when the user performs a gesture to move the hand to the left.

As described above, the electronic device 1 illustrated in FIG. 6 is a smartphone that can be installed in and removed from the console. The electronic device 1 may, as another example, be a car navigation apparatus installed in the vehicle. In this case, the modes of the electronic device 1 need not include the second mode.

Figure 7:
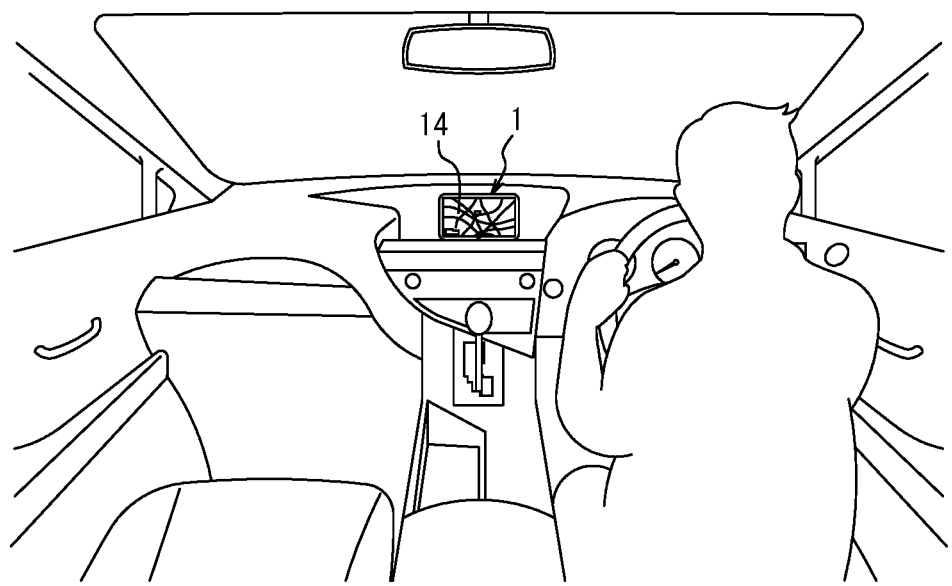
FIG. 7 illustrates an example of conditions in which an electronic device is operated with a gesture.

FIG. 7 illustrates example conditions in which the user operates the electronic device 1 with a gesture. As illustrated in FIG. 7, the electronic device 1 is disposed so that the display 14 is positioned in the central region of the console of the car, for example. In the example in FIG. 7, the user boards the car in which the electronic device 1 is mounted and drives the car while referring to the route to the destination while the route is displayed on the display 14 of the electronic device 1. The proximity sensor 18 is in a state capable of detecting a gesture by the user at this time. The controller 11 executes processing based on the gesture detected by the proximity sensor 18.

The electronic device 1 can receive a touch from the user on the touch panel display. It is not preferable, however, for the user to direct his gaze towards the display 14 for a long time to confirm the position of the touch while driving. The electronic device 1 of the present disclosure enables gesture-based operations by the user. Therefore, the user does not look at the display 14 for a long time while driving.

When the electronic device 1 is in kitchen mode or in car mode, the user can operate the electronic device 1 using a gesture and a touch. The electronic device 1 of the present disclosure associates an operation of the screen with a gesture and a touch as described below. This can improve operability of input operations when, for example, displaying a plurality of screens or adjusting the screen movement amount.

(First Method)

Figure 8:
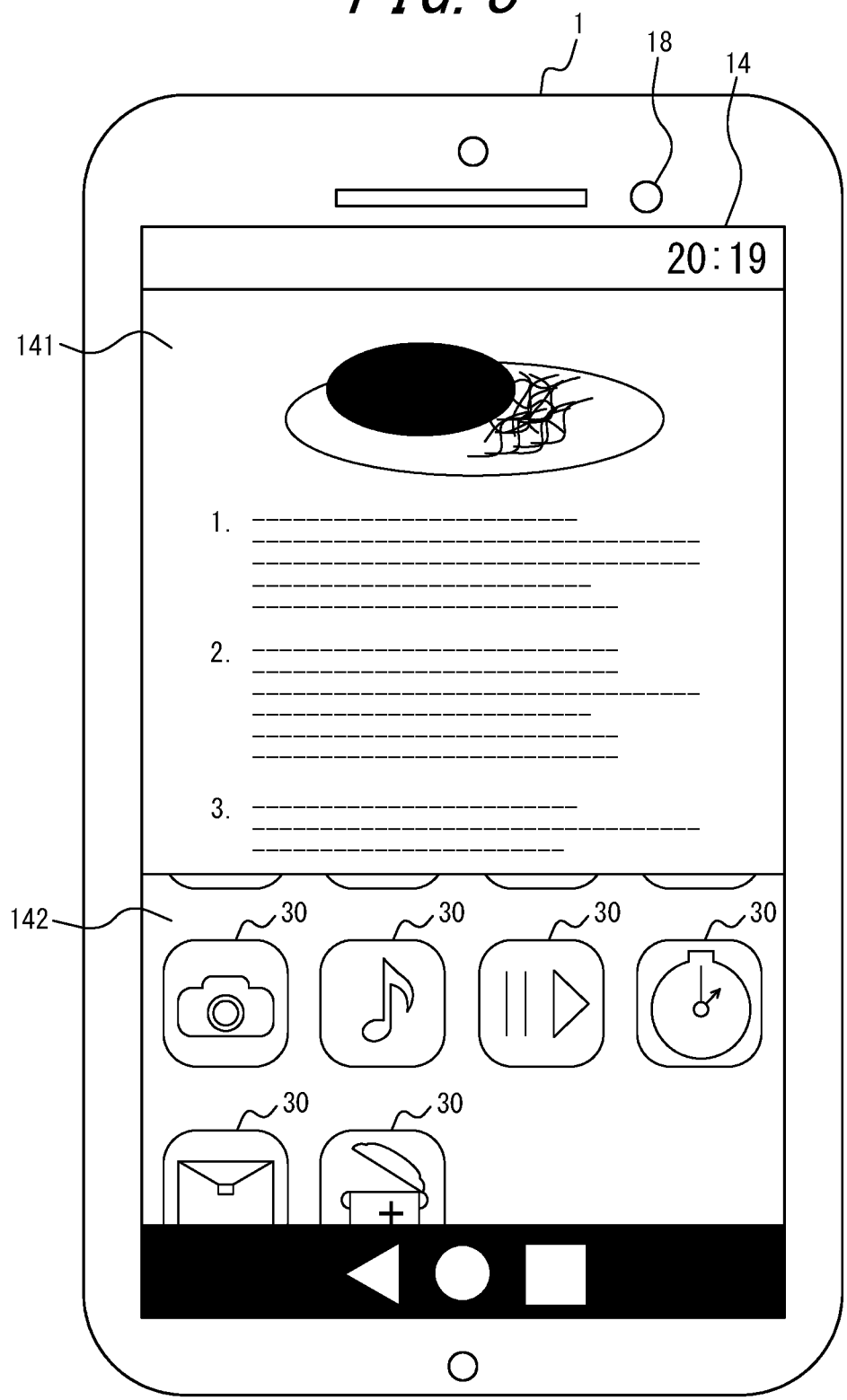
FIG. 8 illustrates an example screen display of an electronic device.

FIG. 8 illustrates an example display screen of the electronic device 1. As illustrated in FIG. 8, a display 14 of the electronic device 1 displays a first screen 141 and a second screen 142. In other words, electronic device 1 has a multi-window function and displays a split-screen on the display 14. The first screen 141 and the second screen 142 can independently execute applications. A cooking recipe is displayed on the first screen 141 in the example in FIG. 8. A home screen on which a plurality of icons 30 are arranged is displayed on the second screen 142 in the example in FIG. 8. The electronic device 1 operates in kitchen mode. A portion of the first screen 141 and the second screen 142 may be displayed in overlap. In the first method and the below-described second method, a gesture detected by the proximity sensor 18 is associated with an operation of the first screen 141, and a touch detected by the touch sensor 26 is associated with an operation of the second screen 142. The touch sensor 26 forms part of a touch panel display integrated with the display 14, as described above.

As the first method, the controller 11 of the electronic device 1 associates a gesture with an operation of the first screen 141. The controller 11 of the electronic device 1 associates a touch with an operation of the second screen 142. In the example in FIG. 8, the proximity sensor 18 is disposed in the upper portion of the display 14 of the electronic device 1, i.e. on the side closer to the first screen 141 than the second screen 142. The controller 11 associates a gesture with an operation of the first screen 141 that is closer to the position where the proximity sensor 18 is disposed than the second screen 142 and associates a touch with an operation of the second screen 142.

Here, the controller 11 may associate a gesture with an operation of the first screen 141 and associate a touch with an operation of the second screen 142 using a table or the like and store the table in the storage 16. For example, the controller 11 stores a table associating a gesture to move the hand up or down with scrolling of the screen in the storage 16 in advance. The controller 11 also stores a table associating a double tap with execution of an application in the storage 16 in advance. The controller 11 reads such tables from the storage 16 and executes the operations associated with gestures and touch operations in accordance with the tables.

Figure 9:
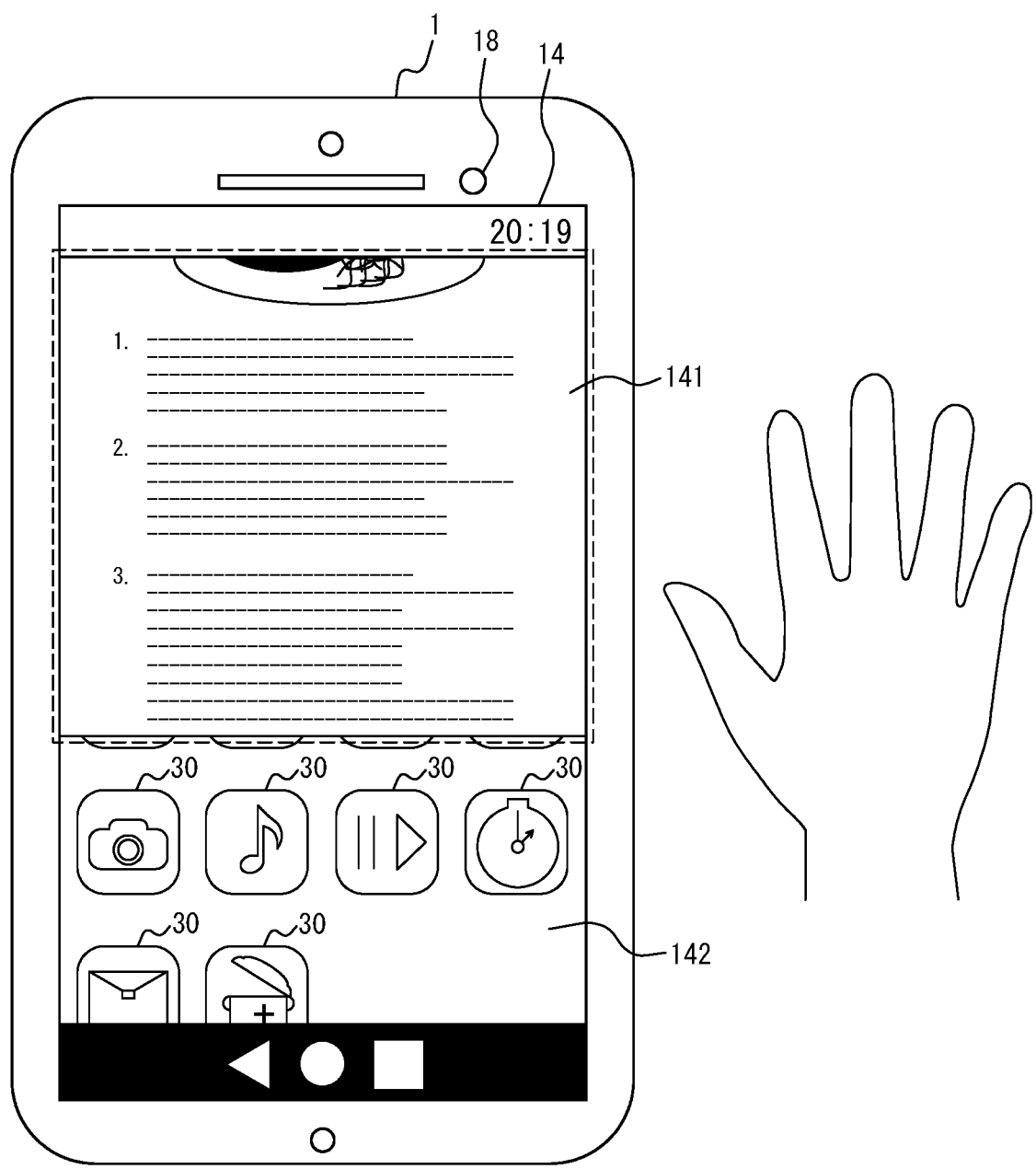
FIG. 9 illustrates an example of gesture-based operation.

FIG. 9 illustrates an example of a gesture-based operation. In the first method, the controller 11 scrolls the cooking recipe displayed on the first screen 141 up or down when a gesture to move the hand up or down is detected by the proximity sensor 18. The direction in which the first screen 141 is scrolled in accordance with the movement direction of the gesturing hand (for example, upward) may be the same (for example, upward) or opposite (for example, downward).

Here, the first screen 141 and the second screen 142 may be displayed in different formats to enable the user to distinguish which screen is operable with gestures (first screen 141). In the present embodiment, the frame color of the first screen 141 differs from the second screen 142. The frame color of the first screen 141 is red, for example. The frame color of the second screen 142 is black, for example. On the screens from FIG. 9 onward, a double frame around the first screen 141 indicates that the frame color is different. As another example, a particular pictogram or the like may be displayed on the first screen 141 (or the second screen 142) to allow the user to distinguish between the screens.

The display format of the frame of the first screen 141 may be changed to indicate to the user that a gesture has been detected by the proximity sensor 18. For example, when a gesture is detected, the line width may change (for example, becoming thicker), the type may change (for example, becoming a dotted or flashing line), or the color may change (for example, from red to blue) in the frame of the first screen 141.

Figure 10:
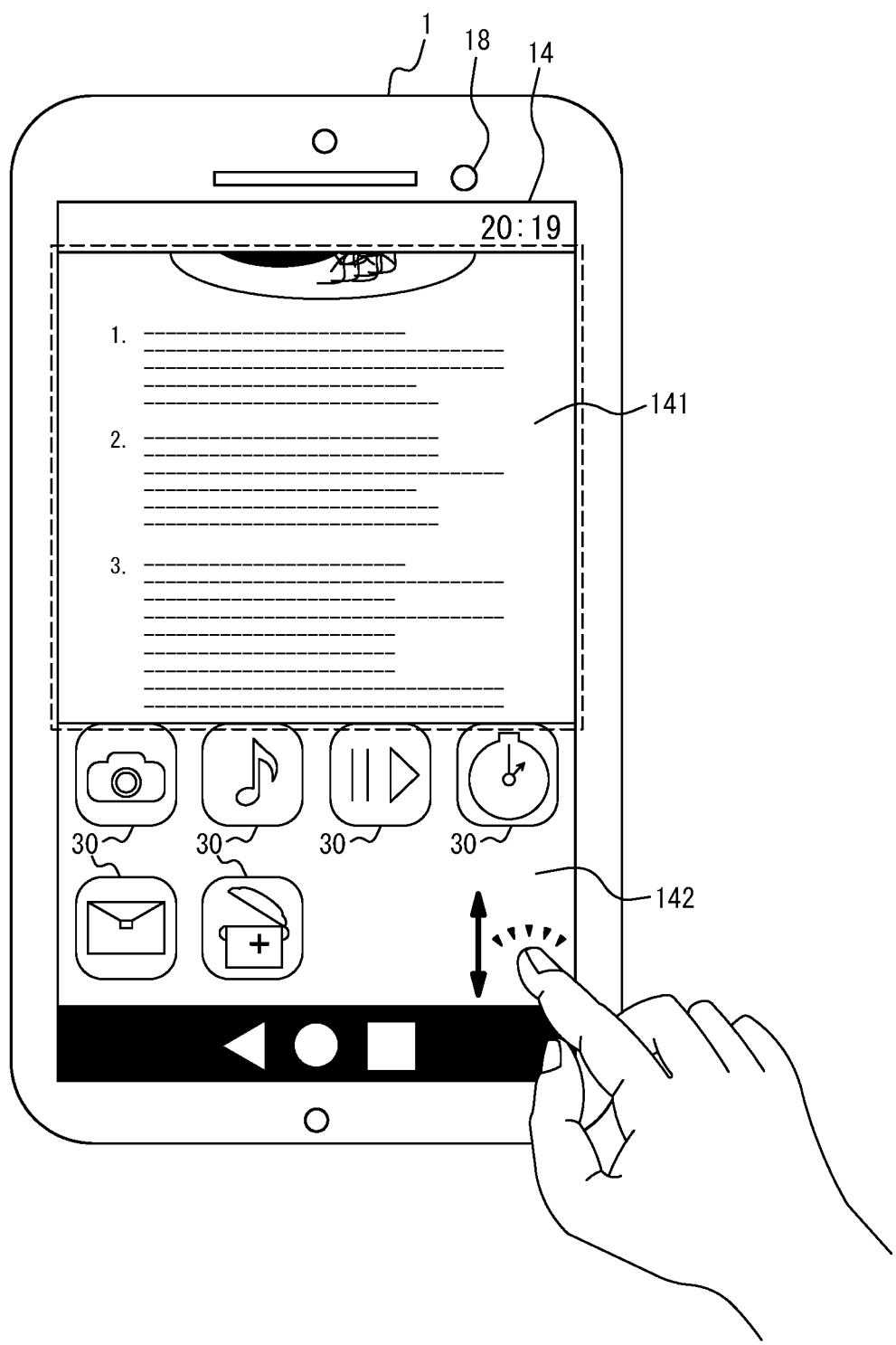
FIG. 10 illustrates an example of touch-based operation.

FIG. 10 illustrates an example of touch-based operation. In the first method, the controller 11 scrolls the home screen, which has the icons 30 arranged thereon and is displayed on the second screen 142, up or down when an up or down slide is detected by the touch sensor 26, for example.

(Second Method)

In the first method, the controller 11 associates a gesture with an operation of the first screen 141 that is closer to the position where the proximity sensor 18 is disposed than the second screen 142. Here, the first screen 141 may in some cases be farther from the position where the proximity sensor 18 is disposed than the second screen 142. In the second method, the controller 11 associates a gesture with an operation of the first screen 141 that is farther from the position where the proximity sensor 18 is disposed than the second screen 142 and associates a touch with an operation of the second screen 142.

Figure 11:
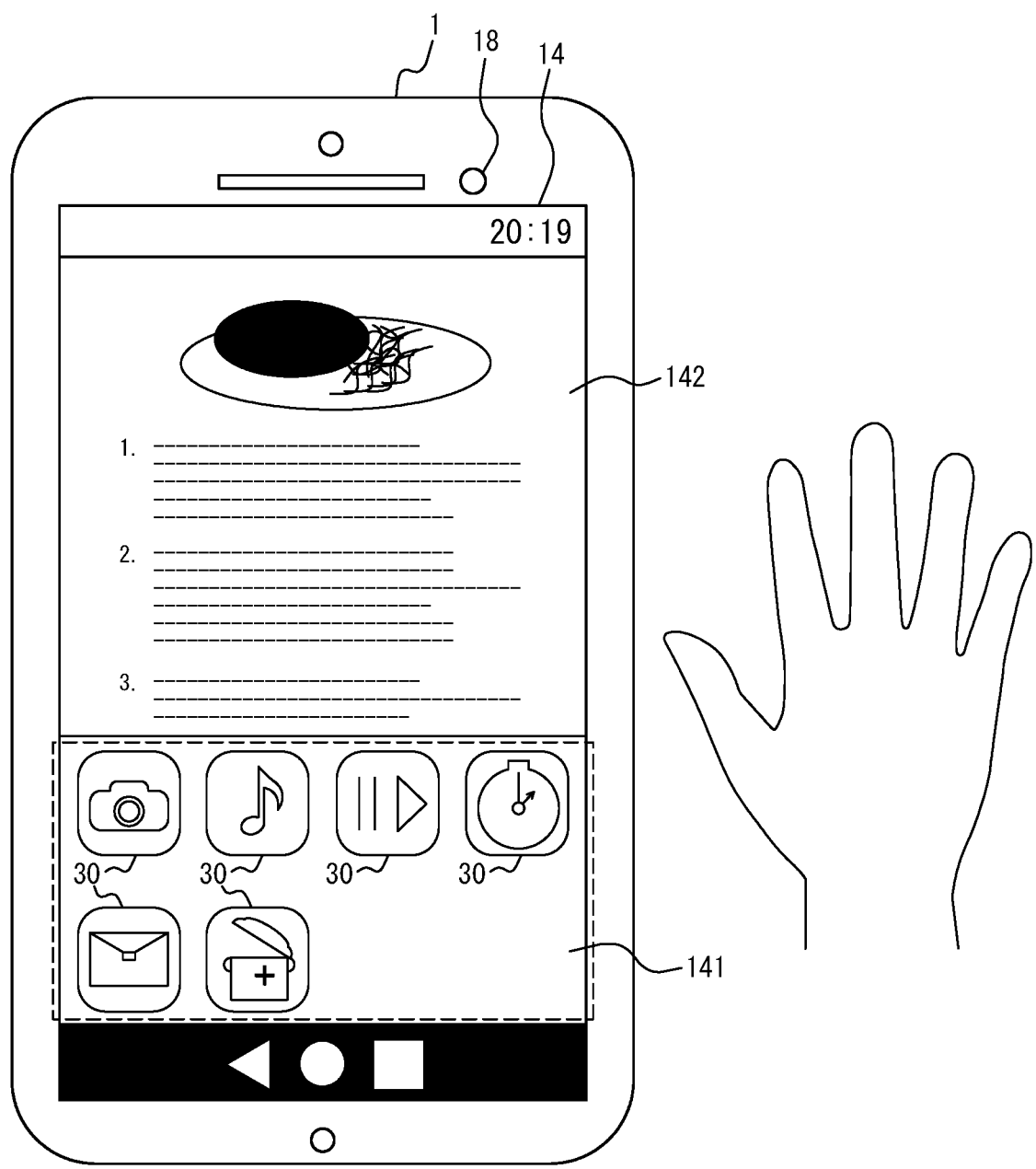
FIG. 11 illustrates an example of gesture-based operation.

FIG. 11 illustrates an example of a gesture-based operation with the second method. In the second method, the controller 11 scrolls the home screen, which has the icons 30 arranged thereon and is displayed on the first screen 141 farther from the proximity sensor 18, up or down when a gesture to move the hand up or down is detected by the proximity sensor 18. The direction in which the first screen 141 is scrolled in accordance with the movement direction of the gesturing hand (for example, upward) may be the same (for example, upward) or opposite (for example, downward). In the second method, the user can scroll the cooking recipe, displayed on the second screen 142 that is closer to the proximity sensor 18, with a touch.

In the first method and the second method, the controller 11 associates a gesture with an operation of the first screen 141 and a touch with an operation of the second screen 142 in accordance with the position where the proximity sensor 18 is disposed. A plurality of divided screens can, in other words, each be operated by a gesture or a touch. In particular, when the display 14 displays two screens as illustrated in FIG. 8, one of the screens is operated by gesture, and the other screen is operated by touch. This enables the user to grasp the operation method easily.

Here, the user may be allowed to select the first method or the second method via a setting of the electronic device 1 selectable from the menu screen, for example. With the first method, the user gestures to operate the first screen 141 that is closer to the position where the proximity sensor 18 is disposed. The user moves the hand (performs a gesture) near the proximity sensor 18 and can therefore intuitively understand which screen is being operated (first screen 141). With the second method, the user gestures to operate the first screen 141 that is farther from the position where the proximity sensor 18 is disposed. The user's hand does not block the first screen 141 targeted for gesture operation (the first screen 141 is not covered by the gesturing hand). This makes the screen (first screen 141) more visible. The user may select the first method when preferring an intuitive understanding of the screen to operate. The user may select the second method when preferring a more visible screen.

(Third Method)

In the third method, the controller 11 associates a gesture with an operation of the first screen 141 that is closer to the position where the proximity sensor 18 is disposed than the second screen 142 and associates a touch not only with an operation of the second screen 142 but also with at least one of an inter-screen operation and a screen erase operation. This method is the same as the first method apart from at least one of an inter-screen operation and a screen erase operation being executed. Here, the inter-screen operation is an operation executed between a plurality of screens. For example, inter-screen operations include switching the display content, as described below, copying the display content, or moving the display content.

As described above, the touch encompasses various actions, such as a tap, double tap, a long tap, and a slide. The controller 11 associates certain touch operations with operations of the second screen 142, as described above. In the third method, the controller 11 associates a touch not associated with an operation of the second screen 142 with at least one of an inter-screen operation and a screen erase operation. For example, the controller 11 may associate a long tap followed by an up or down slide with switching the display content of the first screen 141 and the second screen 142. The controller 11 may, for example, associate a long tap followed by a left or right slide with erasing the second screen 142. Erasing the second screen 142 refers to terminating the application displayed on the second screen 142.

Figure 12:
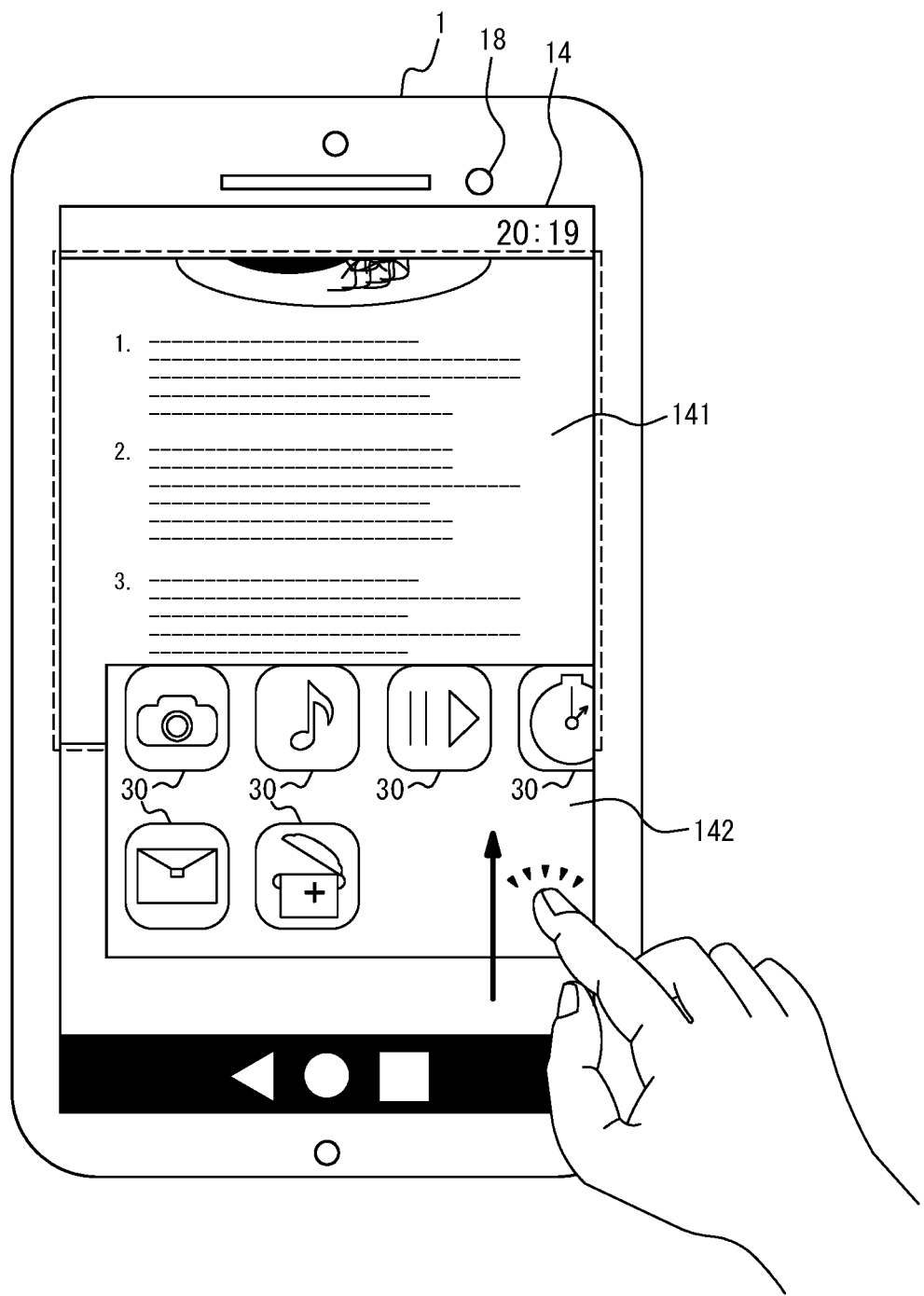
FIG. 12 illustrates an example of touch-based operation.

FIG. 12 illustrates an example of a touch-based operation with the third method. In the third method, the controller 11 changes the display so that the second screen 142 disposed in overlap with the first screen 141 when the user performs a long tap followed by an upward slide on the second screen 142. When the user slides the second screen 142 further upwards, the display content of the first screen 141 and the second screen 142 switch. In other words, the home screen on which a plurality of icons 30 are arranged is displayed on the first screen 141. The cooking recipe is displayed on the second screen 142.

Figure 13:
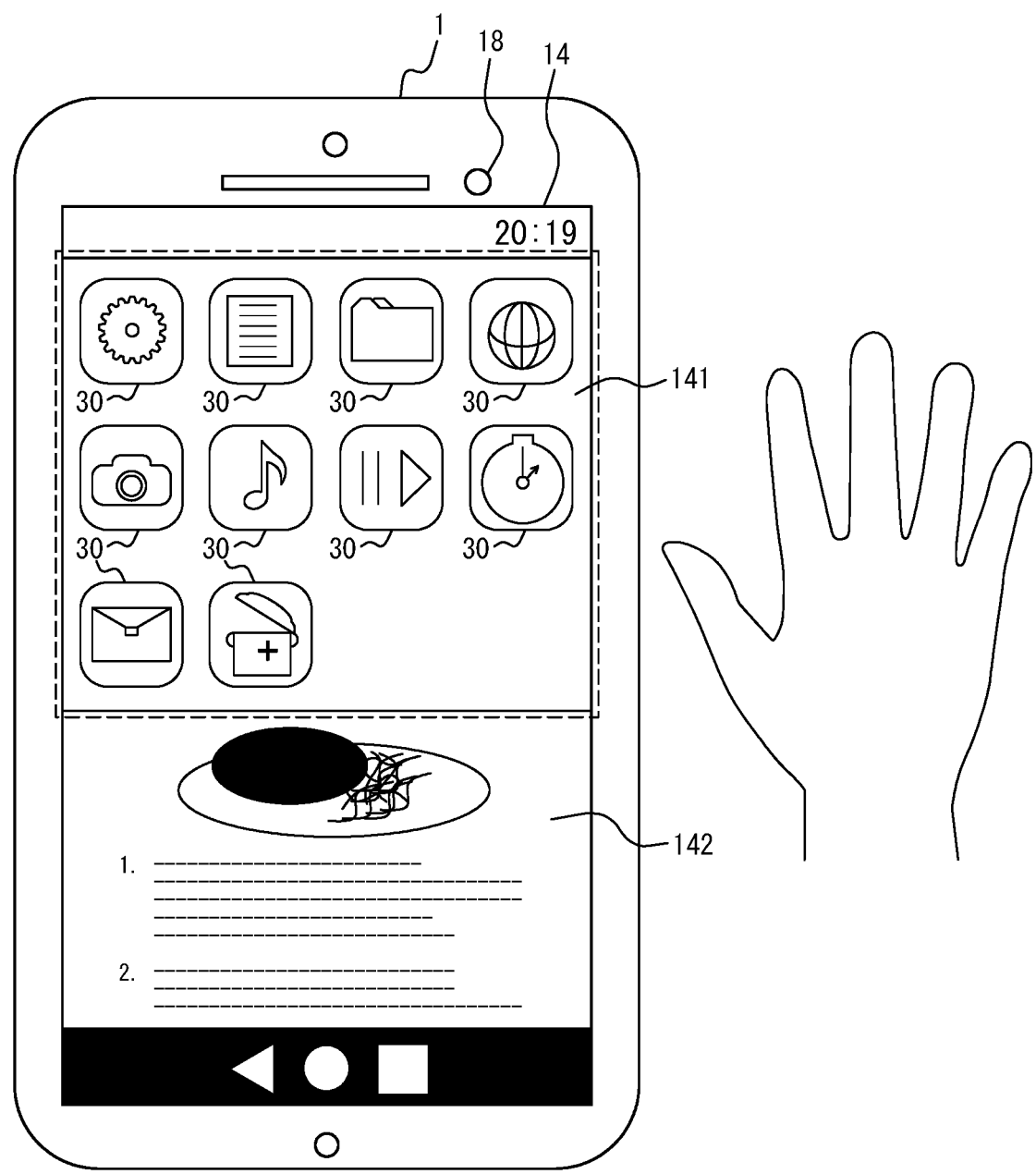
FIG. 13 illustrates an example of gesture-based operation after the operation of FIG. 12.

FIG. 13 illustrates an example of a gesture-based operation performed after the inter-screen operation of FIG. 12. When a gesture to move the hand up or down is detected by the proximity sensor 18, the controller 11 scrolls the home screen, which was switched to being displayed on the first screen 141, up or down.

Figure 14:
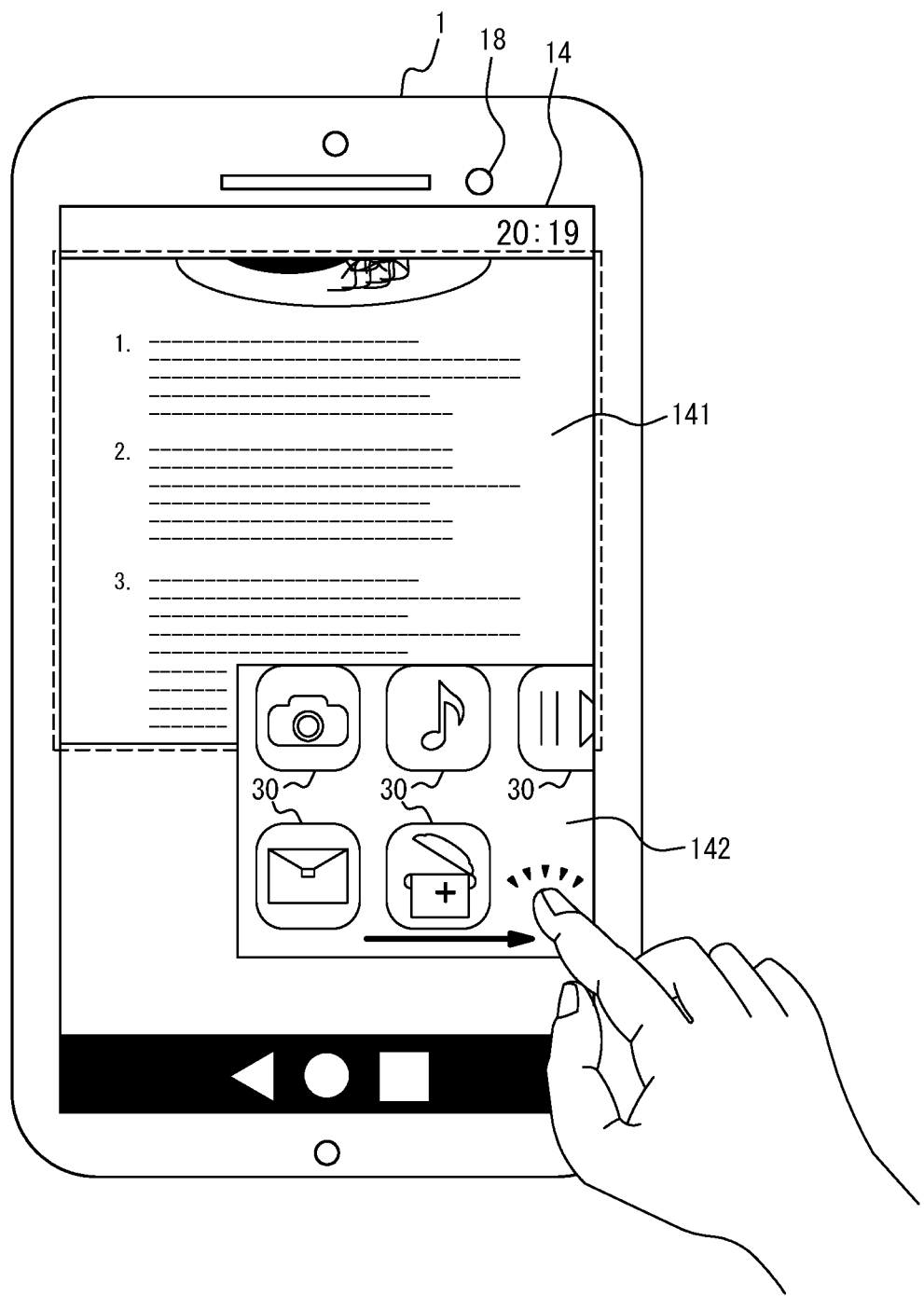
FIG. 14 illustrates an example of touch-based operation.

FIG. 14 illustrates an example of a touch-based operation in the third method. In the third method, the controller 11 changes the display so that the second screen 142 moves to the right when the user performs a long tap followed by a right slide on the second screen 142. When the user slides the second screen 142 farther to the right, the second screen 142 is no longer displayed on the display 14 and is erased.

As another example in the third method, the controller 11 may associate a gesture with an operation of the first screen 141 that is farther from the position where the proximity sensor 18 is disposed than the second screen 142. This method is the same as the second method apart from at least one of an inter-screen operation and a screen erase operation being executed.

As yet another example, the controller 11 may associate a touch with only at least one of an inter-screen operation and a screen erase operation, without associating a touch with an operation of the second screen 142.

As yet another example, the controller 11 may associate a gesture, instead of a touch, with at least one of an inter-screen operation and a screen erase operation. For example, the controller 11 may associate a gesture to trace a circle followed by an up or down gesture with switching the display content of the first screen 141 and the second screen 142. The controller 11 may, for example, associate a gesture to trace a circle followed by a left or right gesture with erasing the second screen 142.

In the third method, the controller 11 associates a touch or a gesture with not only an operation of the first screen 141 or the second screen 142 but also with an inter-screen operation or a screen erase operation. The third method therefore enables an even greater variety of input.

(Fourth Method)

In the fourth method, the controller 11 associates a particular touch that is one type of touch performable on the second screen 142 with a particular operation of the second screen 142 and associates one type of gesture with the same particular operation of the first screen 141. The particular operation is, for example, to display a notification. The touch that can be performed on the second screen 142 is a slide from the outside of the second screen 142 towards the inside of the second screen 142.

Figure 15:
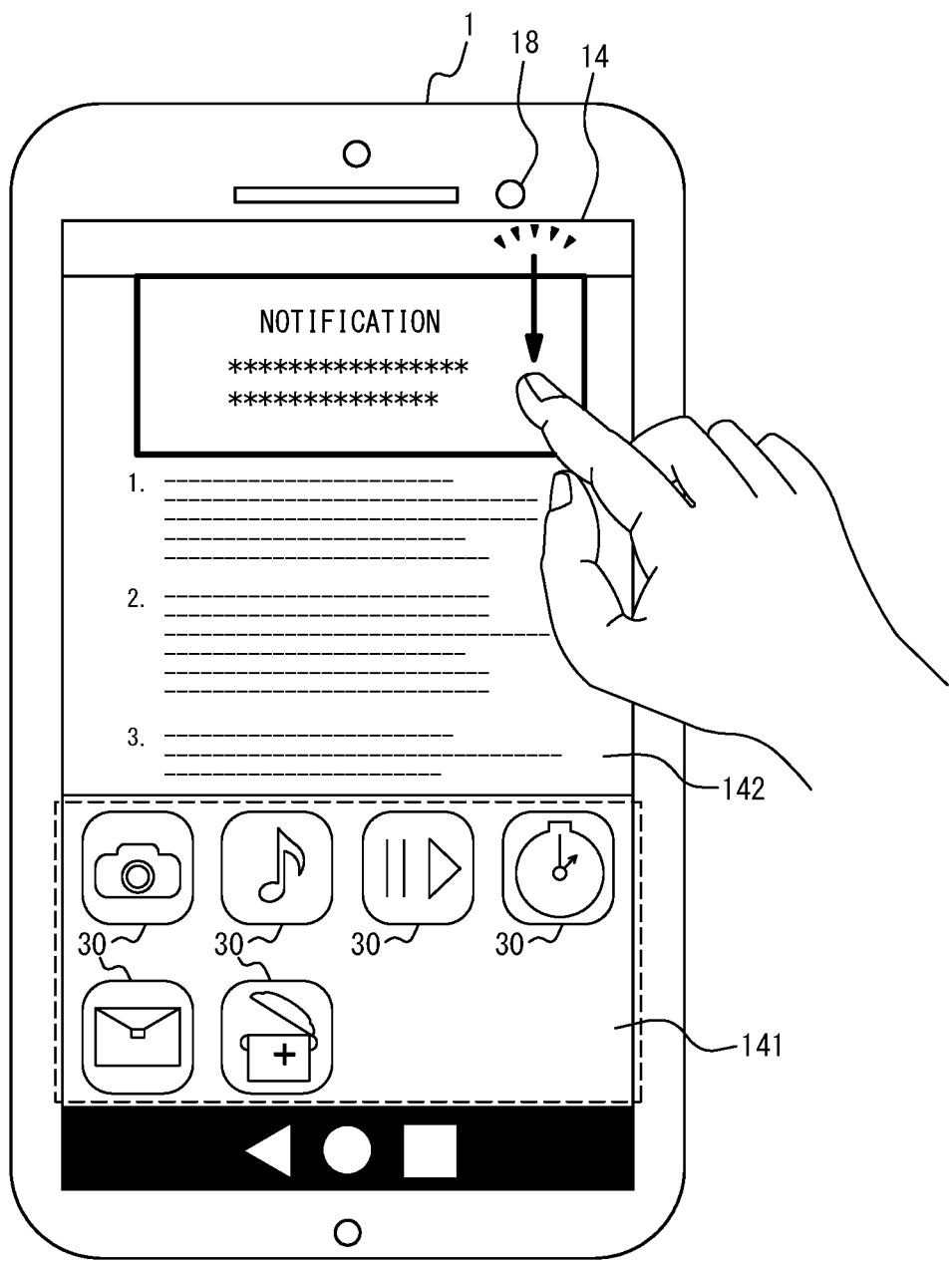
FIG. 15 illustrates an example of touch-based operation.

FIG. 15 illustrates an example of a touch-based operation with the fourth method. In the fourth method, the controller 11 displays a notification when the user performs a slide from the outside of the second screen 142 downward to the inside of the second screen 142. In the example in FIG. 15, the first screen 141 is displayed at a position farther from the position where the proximity sensor 18 is disposed than the second screen 142, as with the second method.

Here, a notification is displayed by being pulled out in response to a slide from the outside toward the inside of the screen. This enables the user to perform an intuitive operation. In the example in FIG. 15, however, if the user performs the slide from the outside of the first screen 141 downward to the inside of the first screen 141, the user is considered to have touched the second screen 142 above the first screen 141. Consequently, the touch by the user is treated as being performed on the second screen 142. In other words, a notification cannot be displayed on the first screen 141 by the same touch as for the second screen 142.

The electronic device 1 of the present disclosure can be operated by gesture. When a particular touch on the second screen 142 cannot be applied as is to the first screen 141, the electronic device 1 can therefore execute a particular operation on the first screen 141 in response to a gesture. In the aforementioned example, the particular touch is a downward slide from the outside of the screen to the inside of the screen. The operation associated with the particular touch (particular operation) is the display of a notification.

Figure 16:
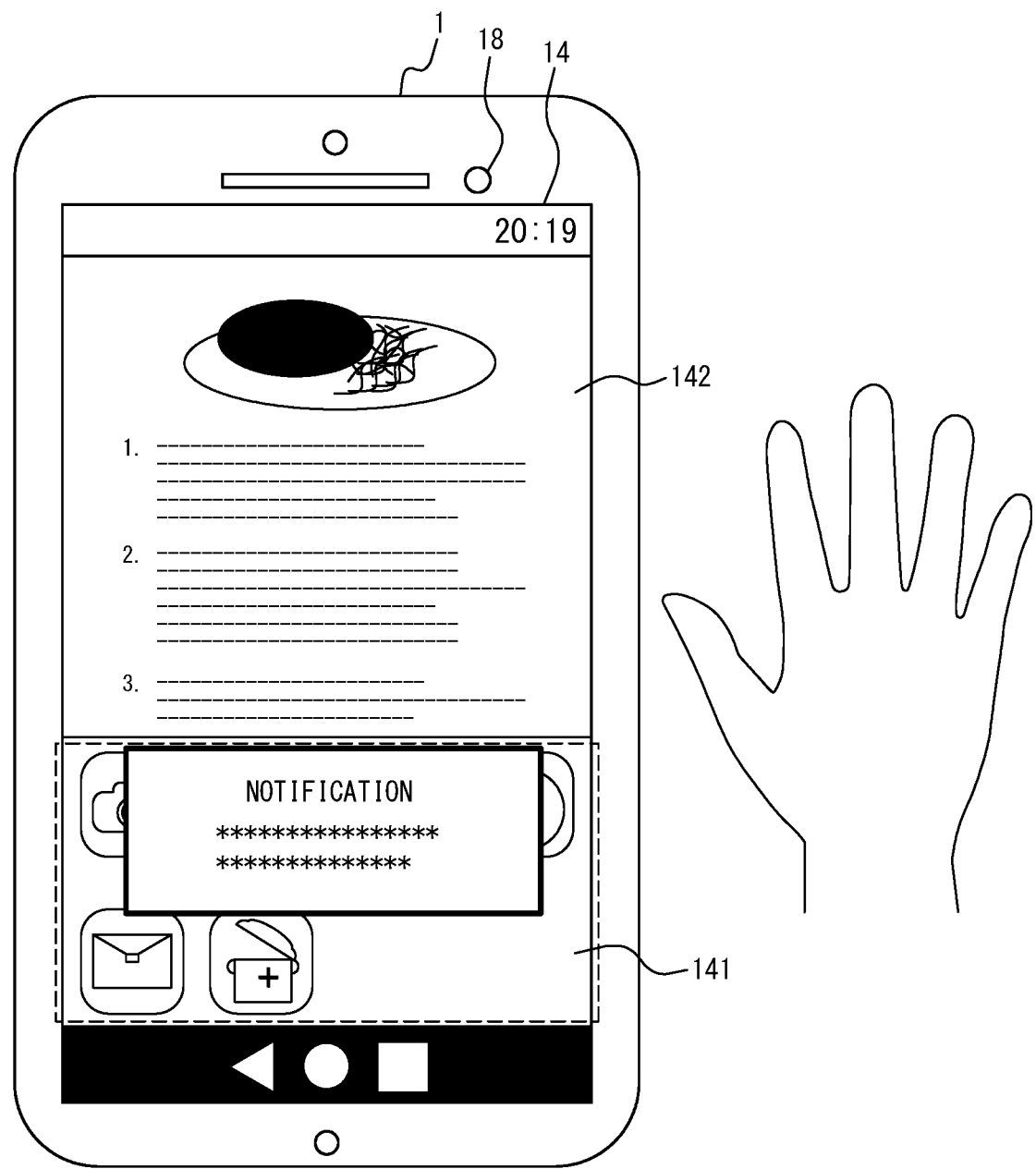
FIG. 16 illustrates an example of gesture-based operation.

FIG. 16 illustrates an example of a gesture-based operation with the fourth method. As illustrated in FIG. 16, the controller 11 associates one type of gesture to move the hand downward with the display of a notification on the first screen 141.

The fourth method is useful when a plurality of screens is displayed on the display 14 and a touch that is used has a start point or end point included in different regions depending on the screen. The regions are, for example, display regions of the screen. In the aforementioned example, the downward slide that is used when a notification is to be displayed on the second screen 142 has a start point outside of the display region of the screen (the first screen 141 and the second screen 142). If a downward slide is performed on the first screen 141, however, the start point is inside the display region of the screen. The start point is thus included in a different region depending on the screen. In such a case, the controller 11 enables execution of a particular operation (for example, display of a notification) on any of a plurality of screens by use of a gesture.

(Fifth Method)

Between an active window and a non-active window displayed simultaneously, the controller 11 in the fifth method associates a touch and a gesture with operation of the active window. The controller 11 associates a gesture with the display of a list of setting items of the active window. An active window refers to a screen in a state in which operations by the user are enabled. A non-active window refers to a screen in a state in which operations by the user are disabled. An application or the like being executed in the non-active window may be running in the background.

Figure 17:
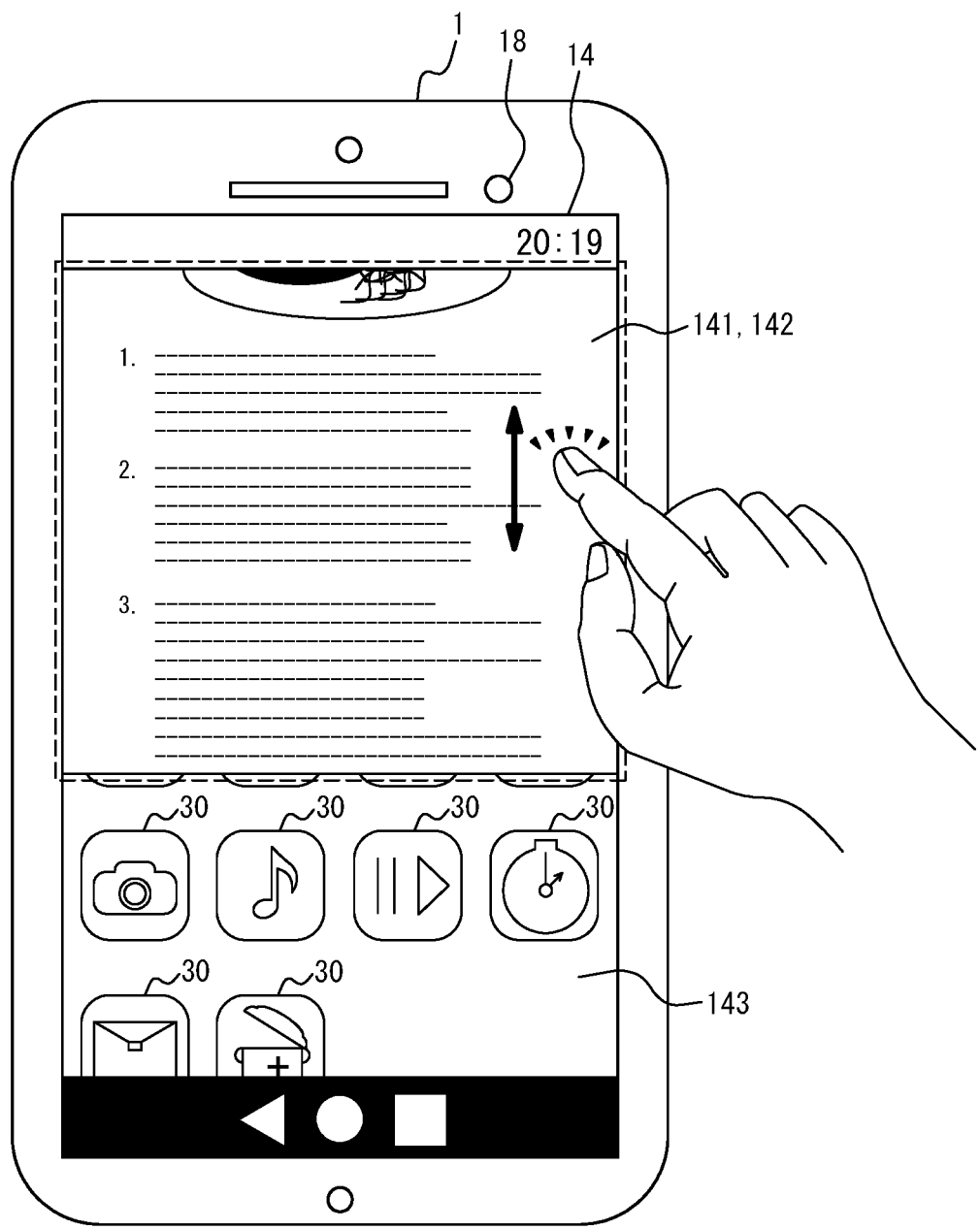
FIG. 17 illustrates an example of touch-based operation.

FIG. 17 illustrates an example of a touch-based operation with the fifth method. In the example in FIG. 17, the user touches the upper screen among the plurality of screens (upper screen and lower screen) displayed on the display 14. The upper screen that is touched is set to be an active window. The lower screen is set to be a non-active window. When the user touches the lower screen, the lower screen is set to be the active window. In other words, the active window can be switched by touching a portion of the screen.

The active window corresponds to the aforementioned first screen 141 and second screen 142. In other words, the user can operate the active window by touch and gesture. The active window is displayed on the display 14 along with a third screen 143, which is a non-active window. As illustrated in FIG. 17, the controller 11 scrolls a cooking recipe displayed in the active window up or down when a touch that slides in the up or down direction is detected by the touch sensor 26.

Figure 18:
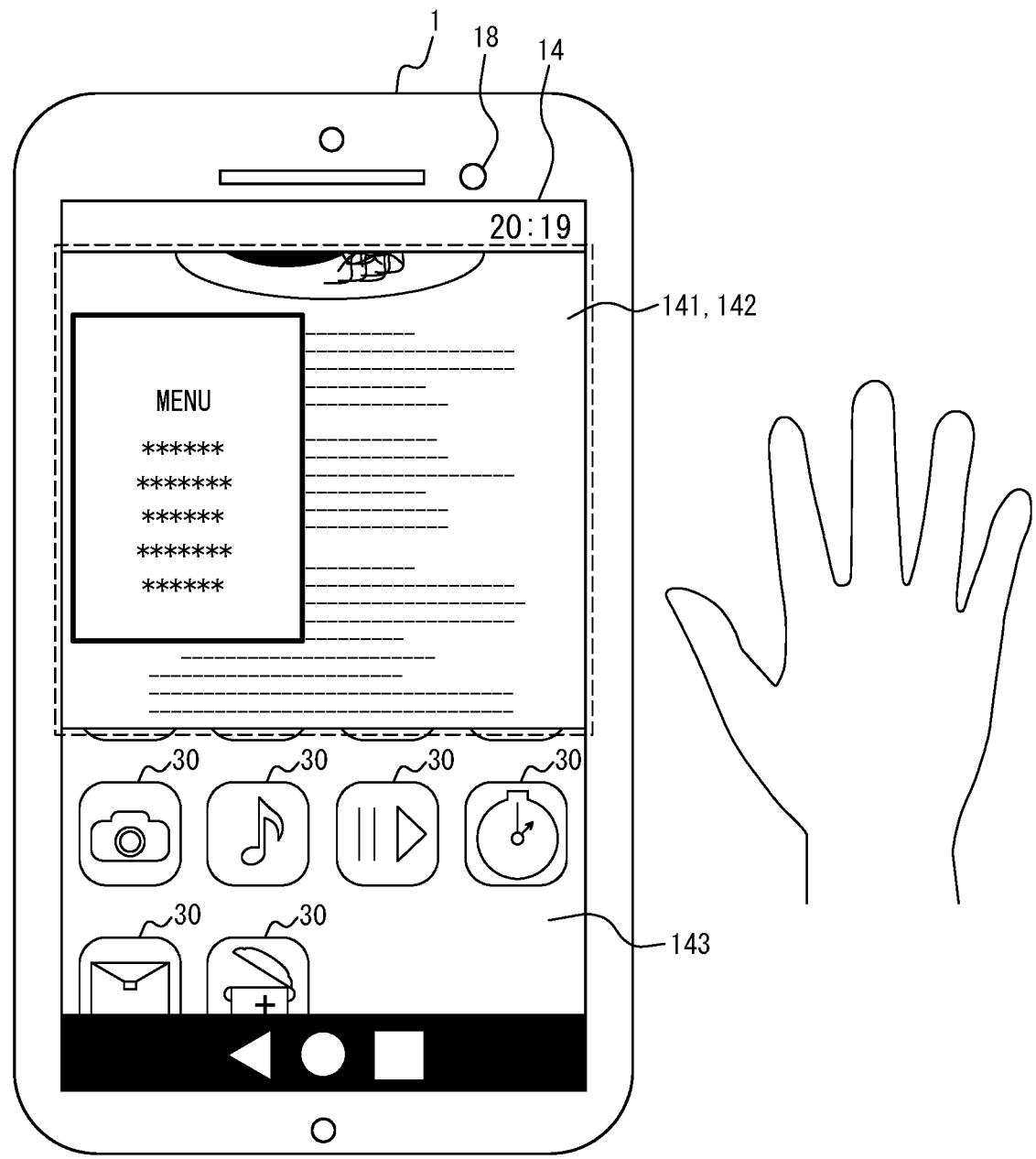
FIG. 18 illustrates an example of gesture-based operation.

FIG. 18 illustrates an example of a gesture-based operation with the fifth method. As illustrated in FIG. 18, the controller 11 associates a gesture to move the hand left or right (horizontal direction) with the display of a menu (list of setting items) in the active window. In the example in FIG. 18, a menu is displayed by being pulled out towards the right from the left edge of the active window in response to a gesture to move the hand to the right. As another example, a menu may be displayed by being pulled out towards the left from the right edge of the active window in response to a gesture to move the hand to the left. As yet another example, a notification may be displayed by being pulled down from the upper edge of the active window in response to a gesture to move the hand downwards.

The fifth method enables touch and gesture-based operations on an active window. The fifth method therefore enables a variety of input on one screen. In the fifth method, the controller 11 associates a gesture with at least the display of a menu. The user can therefore quickly use a gesture to display the menu when the user wishes to change or confirm a setting item.

In the fifth method, a direct operation of the active window (for example, movement of the screen such as scrolling, or erasing the screen) may be associated with a touch, and a supplementary operation (for example, displaying another screen such as a menu) may be associated with a gesture, as in the aforementioned example. Conversely, a direct operation can be associated with a gesture, and a supplementary operation with a touch. Such association with a touch or a gesture depending on the type of operation enables the user to operate the active window more intuitively.

The direction of movement or orientation may differ between a touch and a gesture. For example, the touch may be a movement in a first direction (for example, up or down), whereas only a movement in a second direction (for example, left or right) may be used as the gesture. The touch may also be a movement with a first orientation (for example, downward and leftward), whereas only a movement with a second orientation (for example, upward and rightward) may be used as the gesture. Since both a touch and a gesture can be used on one active window, the user might become confused if movements were in the same direction or had the same orientation. Overlap between the direction or orientation of a touch and a gesture may therefore be avoided to facilitate use of a touch and a gesture by the user.

(Sixth Method)

The electronic device 1 has been illustrated as operating in kitchen mode in FIGS. 8 through 18, but a gesture may be associated with an operation of the first screen 141 and a touch with an operation of the second screen 142 when the electronic device 1 operates in car mode as well.

Figure 19:
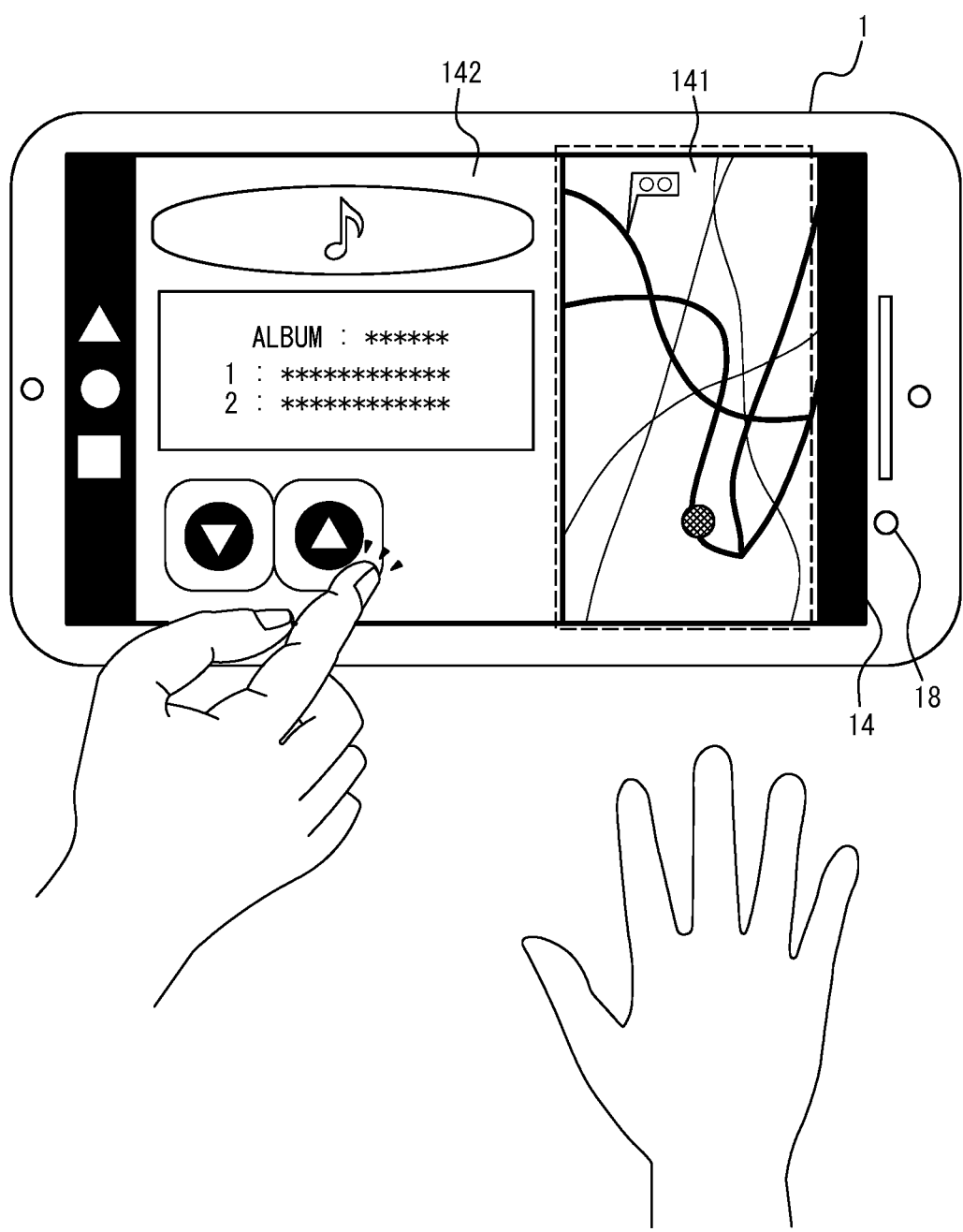
FIG. 19 illustrates an example of gesture and touch-based operation.

FIG. 19 illustrates an example of a gesture and touch-based operation with the sixth method. In the example of FIG. 19, the proximity sensor 18 is located on the driver's seat side and is suited for detecting a gesture by the driver. A map for navigating the vehicle to its destination is displayed on the first screen 141, which is closer to the proximity sensor 18. Road names, the current position of the vehicle indicated by a circle, and the like are displayed on the map. An audio operation screen is displayed on the second screen 142, which is farther from the proximity sensor 18. The selected album and song names, a volume button, and the like are displayed on the audio operation screen, for example.

As illustrated in FIG. 19, the controller 11 associates a gesture to move a hand up, down, left, or right with movement of the map on the first screen 141. The controller 11 also associates a touch on the volume buttons (the buttons with up and down arrows) with adjustment of the volume on the second screen 142.

The driver can move the map with a gesture. The driver can operate the electronic device 1 without needing to look at the display 14 for a long time to confirm the position of a touch. A user who is not driving can adjust the audio volume by touch on the second screen 142 from the passenger seat.

In the sixth method, the controller 11 associates a gesture with an operation of the first screen 141 and a touch with an operation of the second screen 142 in accordance with the position of the proximity sensor 18 on the driver's seat side. At this time, the driver can safely operate the electronic device 1 by gesture. The user in the passenger seat can perform various operations by touch. When the electronic device 1 operates in car mode, the position of the proximity sensor 18 is not limited to the position illustrated in FIG. 19. For example, the proximity sensor 18 may be installed at any position that is closer to the driver's seat side than the passenger side when the electronic device 1 is used.

Flowchart

Figure 20:
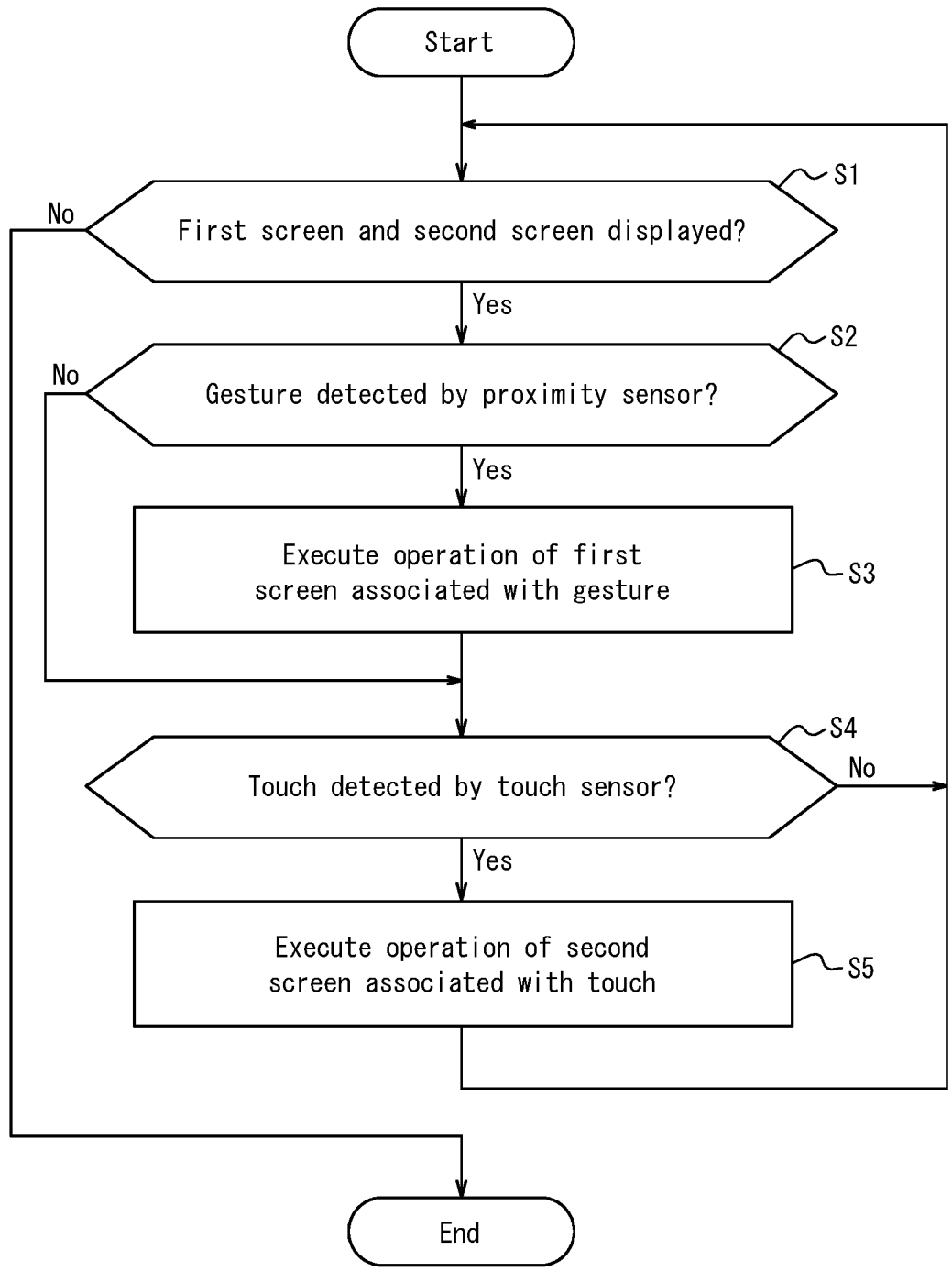
FIG. 20 is a flowchart illustrating an example of processing corresponding to user operation of an electronic device.

FIG. 20 is a flowchart illustrating an example of processing in response to user operation of the electronic device 1 in the aforementioned first through sixth methods.

When the first screen 141 and the second screen 142 are displayed on the display 14 (step S1: Yes), the controller 11 of the electronic device 1 proceeds to step S2. Here, the first screen 141 and the second screen 142 can be displayed when a multi-window function has been used by the user. The controller 11 of the electronic device 1 also proceeds to the processing of step S2 when an active window corresponding to the first screen 141 and the second screen 142 and a non-active window are displayed.

When the first screen 141 and the second screen 142 are not being displayed on the display 14 (step S1: No), the controller 11 of the electronic device 1 ends the processing.

When a gesture is detected by the proximity sensor 18 (step S2: Yes), the controller 11 of the electronic device 1 executes the operation of the first screen 141 associated with the gesture (step S3).

When a gesture is not detected by the proximity sensor 18 (step S2: No), or after the processing of step S3, the controller 11 of the electronic device 1 proceeds to the processing of step S4. Here, the controller 11 of the electronic device 1 may proceed to the processing of step S4 when no gesture is detected within a predetermined time (for example, one minute).

When a touch is detected by the touch sensor 26 (step S4: Yes), the controller 11 of the electronic device 1 executes the operation of the second screen 142 associated with the touch (step S5).

When no touch is detected by the touch sensor 26 (step S4: No), or after the processing of step S5, the controller 11 of the electronic device 1 returns to the processing of step S1. Here, the controller 11 of the electronic device 1 may return to the processing of step S1 when no touch is detected within a predetermined time (for example, one minute).

(Seventh Method)

The controller 11 of the electronic device 1 can improve the operability of the electronic device 1 by associating a gesture and a touch with a plurality of different movement amounts. In the example described below, a plurality of different movement amounts are simultaneously used in one application. A plurality of screens (multi-window) may be used, but the case of only one screen is described in the example below. The electronic device 1 operates in a mode enabling gesture-based operation.

Figure 21:
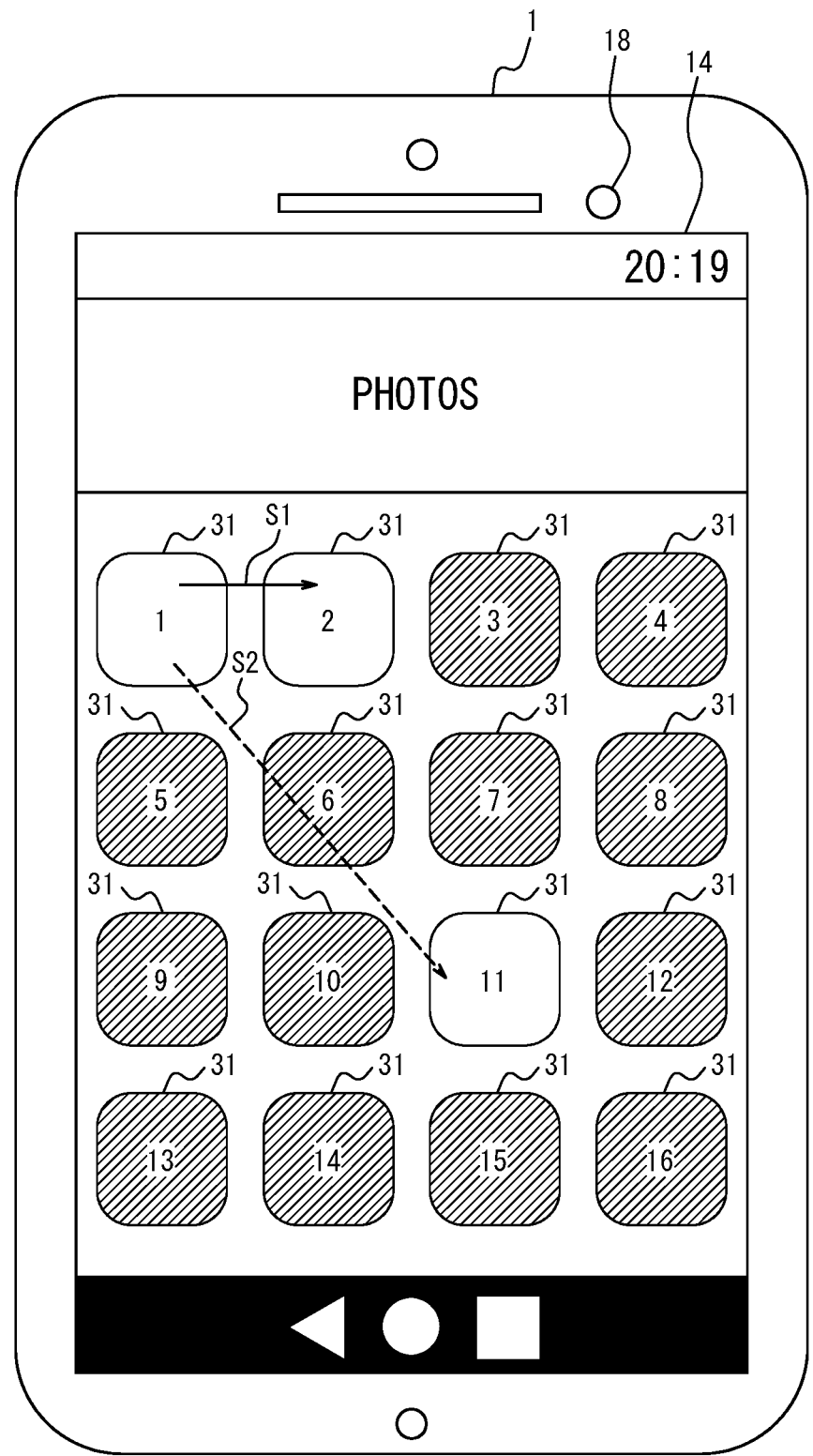
FIG. 21 illustrates a difference in the screen movement amount.

FIG. 21 is a screen of an application for displaying photographs. In the example of FIG. 21, a list of a plurality of photographs reduced in size to thumbnails 31 is displayed. Numbers are attached to the thumbnails 31 in a predetermined order (for example, in the order of date and time of shooting). These numbers are used below when distinguishing between the photographs. For example, the first photograph refers to the photograph with the number "1" attached thereto in FIG. 21. When the user taps the thumbnail 31 of the first photograph in this application, for example, a large view of the first photograph is displayed on the display 14.

In an application for displaying photographs, many touch operations may be necessary for the user to display a desired photograph when the number of photographs increases. A demand for increasing the scroll amount of the display (for example, the number of photographs skipped) therefore exists. The user also needs a function to display photographs one by one in such an application.

In the seventh method, the controller 11 associates a gesture and a touch with operations to change the screen by different movement amounts. In greater detail, the controller 11 sets the screen movement amount per basic operation based on a gesture to be greater than the screen movement amount per basic operation based on a touch. The screen movement amount refers to the magnitude of change in the display content of the screen, such as the scroll amount. As described above, the screen movement amount includes the magnitude of the change (for example, the number of photographs skipped) in the display content on a photograph display application or the like. The screen movement amount also includes a change in coordinates when a map is scrolled, for example. The screen movement amount also includes the amount of change (for example, the length of time to fast-forward) for an instruction to fast-forward in a video playback application, for example. A basic operation is a one-time operation. An example of such a gesture is an operation to move a hand downward once. An example of such a touch is a single touch.

In the example in FIG. 21, the controller 11 sets a movement amount S1 of the screen, i.e. the number of photographs to change, per basic operation based on a touch. The controller 11 sets a movement amount S2 of the screen, i.e. the number of photographs to change, per basic operation based on a gesture (for example, an operation to move a hand horizontally) to 10 photographs. The controller 11 may store the movement amount S1 of the screen per basic operation based on a touch and the movement amount S2 of the screen per basic operation based on a gesture in the storage 16.

Figure 22:
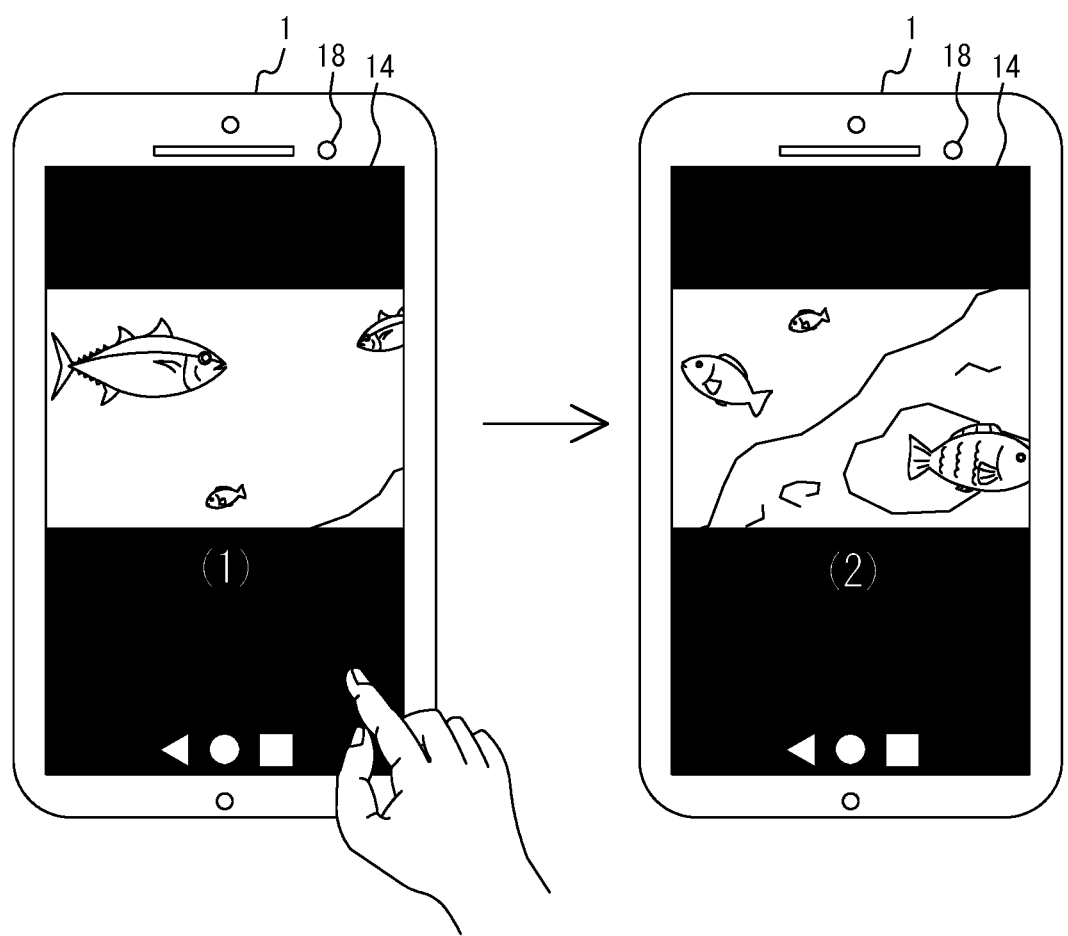
FIG. 22 illustrates an example of touch-based operation.

FIG. 22 illustrates an example of a touch-based operation with the seventh method. In the example in FIG. 22, the user performs a touch once by moving the finger in contact to the left while the first photograph is displayed on the display 14. When the touch is detected by the touch sensor 26, the controller 11 acquires the movement amount S1 of the screen per basic operation based on a touch from the storage 16. The controller 11 then changes the display content by one photograph to display the second photograph on the display 14. The correspondence between the direction of the touch by the user and the change in the number of the photograph can be freely set. For example, one touch operation by the user to move the finger in contact downward may cause the photograph one larger in number to be displayed on the display 14.

Figure 23:
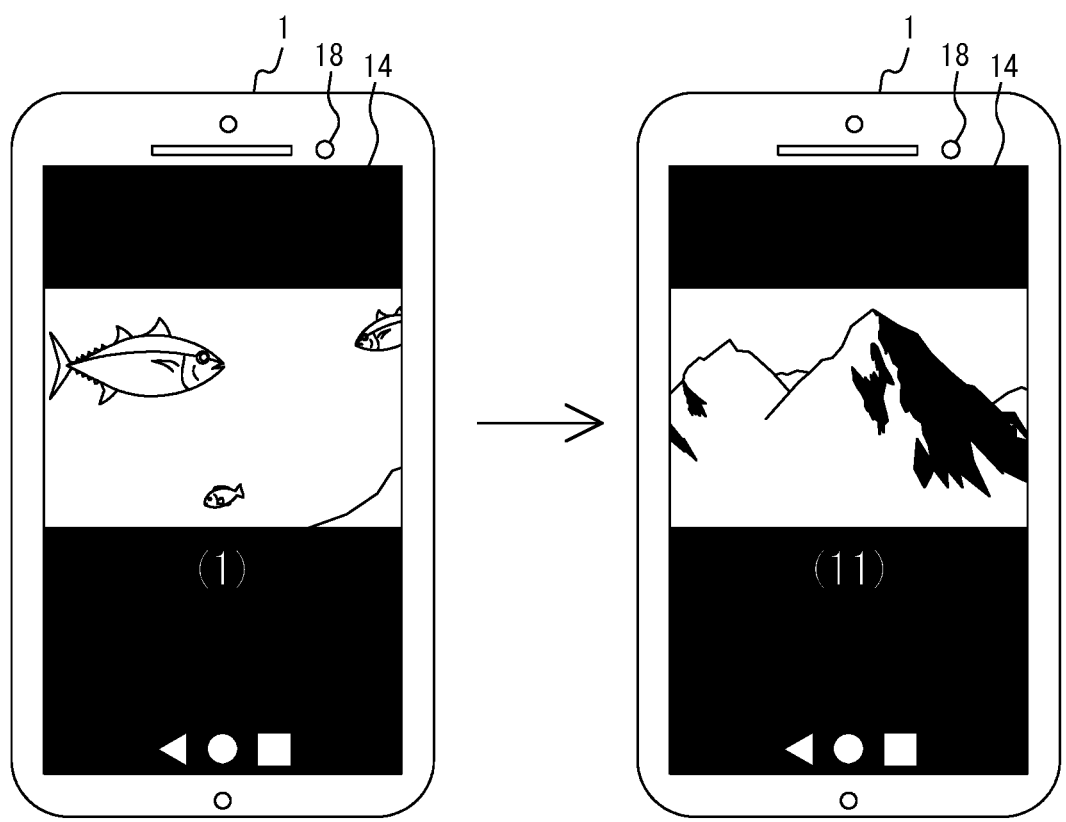
FIG. 23 illustrates an example of gesture-based operation.

FIG. 23 illustrates an example of a gesture-based operation with the seventh method. In the example in FIG. 23, the user performs a gesture once by moving a hand to the right while the first photograph is displayed on the display 14. When the gesture is detected by the proximity sensor 18, the controller 11 acquires the movement amount S2 of the screen per basic operation based on a gesture from the storage 16. The controller 11 then changes the display content by ten photographs to display the 11$^{th}$ photograph on the display 14. The correspondence between the direction of the gesture by the user (for example, horizontal hand movement) and the change in the number of the photograph can be freely set. For example, one gesture to the left by the user may cause the photograph that is ten larger in number to be displayed on the display 14. One gesture to the left by the user may, for example, cause the photograph that is ten smaller in number to be displayed on the display 14.

The seventh method enables both an operation to move the screen a small amount with a touch and an operation to move the screen a large amount with a gesture, as in the aforementioned example. Accordingly, the user can use a gesture to move the screen more than with a touch (in the previous example, to display a photograph with a greater difference in number). This enables more efficient operations than when a touch operation is repeated many times, for example. In the example of FIG. 21, the user can cause the 12$^{th}$ photograph, for example, to be displayed with only one gesture and two touch operations, instead of 12 repeated touch operations. In other words, the user can move the screen to display desired data with fewer movements.

The controller 11 may be configured to enable execution of a gesture-based operation only when a predetermined condition is satisfied. For example, in the case of the above-described application for displaying photographs, the controller 11 may be configured to disable gesture-based operation when the photograph data is less than the movement amount of one gesture (10 photographs). At this time, the controller 11 can turn the proximity sensor 18 off to reduce power consumption. In the case of the above-described application for displaying photographs, the screen movement amount is in units of photographs, but the screen movement amount may instead be set based on the time of shooting, for example. The movement amount by gesture may, for example, be set to one year. At this time, the user can cause photographs from one year earlier or later to be displayed with a single gesture. When the difference between the date and time of shooting is less than the movement amount of one gesture (1 year), the controller 11 may turn the proximity sensor 18 off to disable gesture-based operation.

(Eighth Method)

When the electronic device 1 is operating in car mode, and the user wishes to see a map of the area around the current position of the vehicle, for example, the user can move the screen by touching (for example, tapping) the touch panel display. Here, the user may wish to know information of an intersection (turn) that is distant from the current position of the vehicle. The user may, however, need to perform many touch operations until the desired intersection is displayed, particularly when the user has zoomed in on the map. Demand therefore exists for an automatic display of the next intersection. On the other hand, a conventional function for a small screen shift with a touch is also required in such a car navigation apparatus. The controller 11 of the electronic device 1 associates a gesture and a touch with different information to enable display of the screen with different movement amounts.

Figure 24:
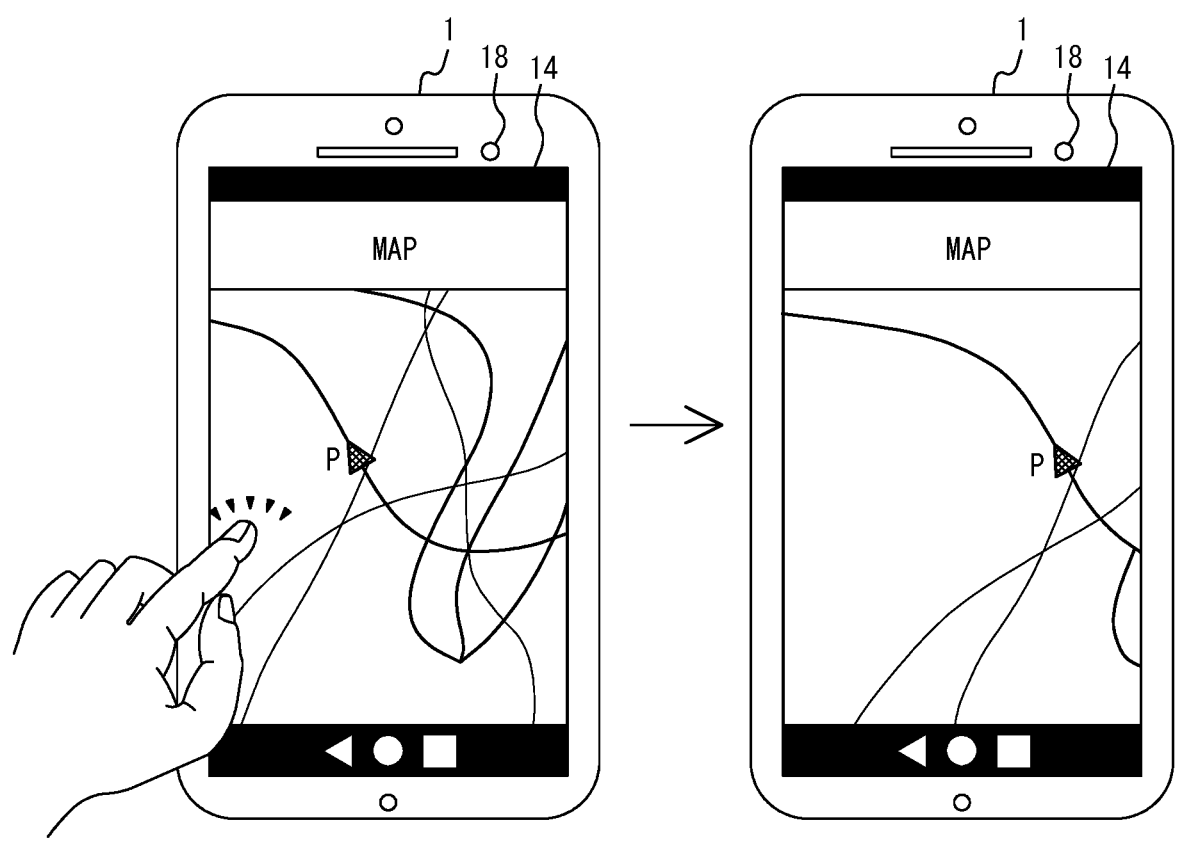
FIG. 24 illustrates an example of touch-based operation.

FIG. 24 illustrates an example of a touch-based operation with the eighth method. In the example of FIG. 24, a map is displayed on the display 14 (touch panel display). The map P indicates the current position of the vehicle in which the user is riding. When the user taps the touch panel display, for example, the controller 11 acquires the coordinates of the tapped position from the touch panel display. The controller 11 then calculates the coordinates so that the tapped position becomes the center of the display 14 and moves the map based on the calculation result. In this way, the controller 11 in the eighth method determines the screen movement amount based on coordinate information (an example of second information) associated with a touch detected by the touch sensor 26. As another example, the controller 11 may set a constant screen movement amount per tap. For example, when the user taps a position to the upper left from the center of the touch panel display, the display of the entire screen may be shifted by a constant movement amount in the opposite direction (towards the lower right). The constant movement amount may be determined by distance (for example, 500 meters).

Figure 25:
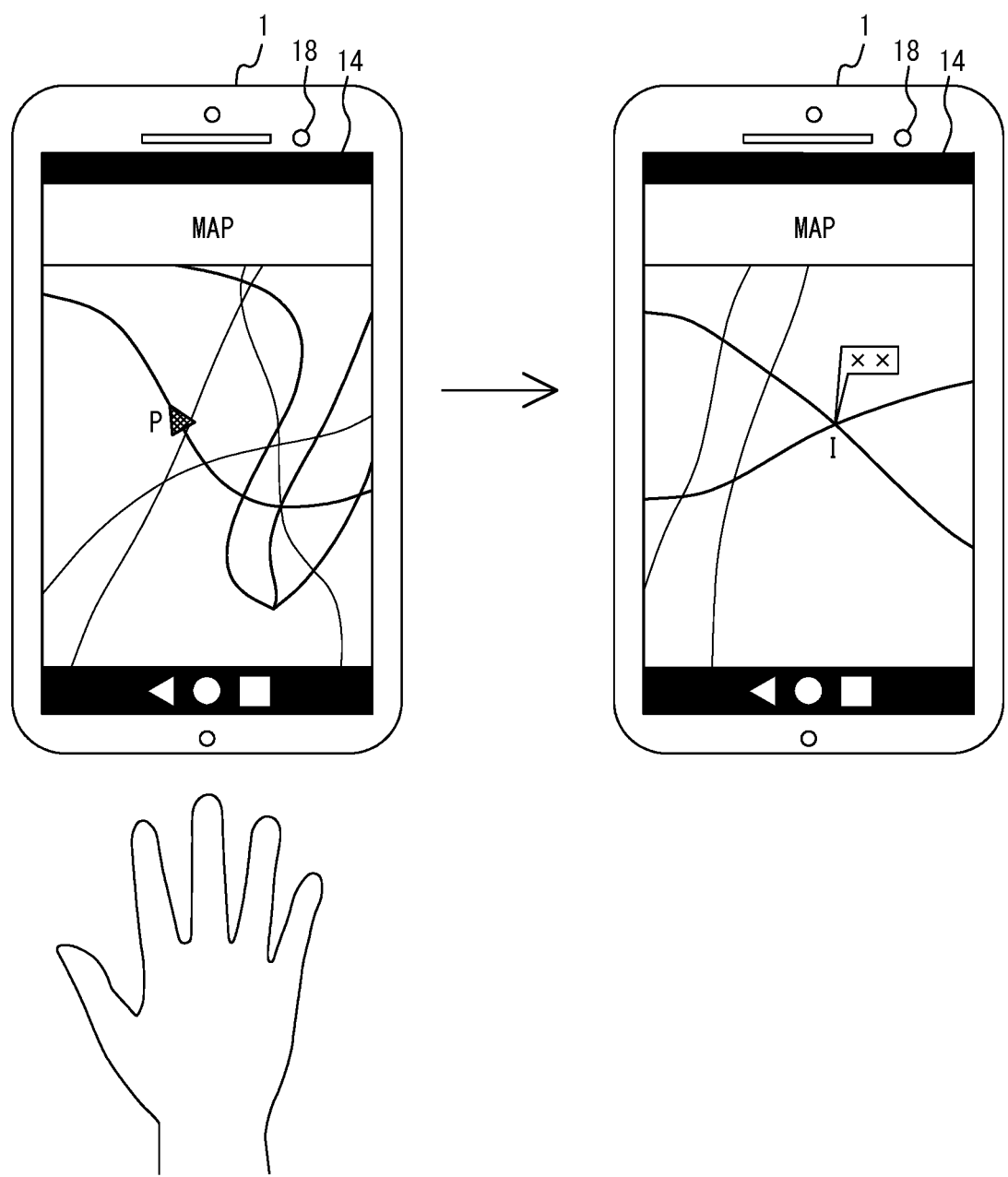
FIG. 25 illustrates an example of gesture-based operation.

FIG. 25 illustrates an example of a gesture-based operation with the eighth method. The user performs a gesture to move a hand to the left, for example, once. When the gesture is detected by the proximity sensor 18, the controller 11 acquires information of the map from the storage 16. The information of the map includes information of roads and intersections. The controller 11 then searches for the next intersection I, to the left of the current position of the vehicle, of the road on which the vehicle is currently traveling. The controller 11 moves the map so that the position of the intersection I found by the search is displayed near the center of the display 14. In this way, the controller 11 in the eighth method determines the screen movement amount based on intersection information (an example of first information) associated with a gesture detected by the proximity sensor 18. The controller 11 may use another screen, such as a pop-up, to display detailed information (such as a large display) of the intersection I found by the search. As another example, the controller 11 may search for the next intersection in the current travel direction of the vehicle regardless of the direction of the hand in the gesture.

In the eighth method, the controller 11 associates a touch and a gesture with two different pieces of information (for example, information of coordinates and information of an intersection), as in the aforementioned example. The controller 11 sets different movement amounts of the screen based on the two different pieces of information. The user can use a gesture to move the screen by a different movement amount than with a touch (in the previous example, to move the screen to the next intersection I). This enables more efficient operations than when a touch operation is repeated many times, for example.

(Ninth Method)

When the electronic device 1 is operating in car mode, and the user is caught in a traffic jam on the highway, the user may wish to learn quickly how far the traffic jam continues. A conventional car navigation apparatus, however, typically displays the names of subsequent interchanges in order along with a background color indicating whether a traffic jam is in progress. Accordingly, the user needs to perform many touch operations to scroll and find the next interchange without a traffic jam. The controller 11 of the electronic device 1 associates a gesture and a touch with different information to enable display of the screen with different movement amounts.

FIG. 26 illustrates an example of a gesture-based operation with the ninth method. The electronic device 1 displays a map and a pop-up window 144, indicating information such as the names of interchanges, on the display 14. The user performs a gesture to move a hand to downward, for example, once. When the gesture is detected by the proximity sensor 18, the controller 11 acquires traffic information from the storage 16. The controller 11 searches for the first interchange ("GHI" in the example of FIG. 26) where the traffic jam is resolved among the interchanges through which the vehicle is expected to travel. The controller 11 then moves the display of the pop-up window 144 so that the interchange found by the search is displayed along with the two preceding interchanges ("ABC" and "DEF" in the example of FIG. 26). "ABC" and "DEF" are displayed with a background color indicating that a traffic jam is in progress. In this way, the controller 11 in the ninth method determines the screen movement amount based on traffic information (an example of first information) associated with a gesture detected by the proximity sensor 18. The user can also move the display of the pop-up window 144 by touch. At this time, information such as the name of the interchange displayed on the pop-up window 144 is shifted by one.

As in the eighth method, the controller 11 in the ninth method associates a touch and a gesture with two different pieces of information (for example, information of interchanges and traffic information). The controller 11 sets different movement amounts of the screen based on the two different pieces of information. The user can use a gesture to move the screen by a different movement amount than with a touch. This enables more efficient operations than when a touch operation is repeated many times, for example. As another example, the controller 11 may use information of a service area or a parking area on the highway. Based on the traffic information, the controller 11 may, for example, respond to a user gesture by immediately displaying a service area or a parking area with available parking, i.e. that is not full.

Flowchart

Figure 27:
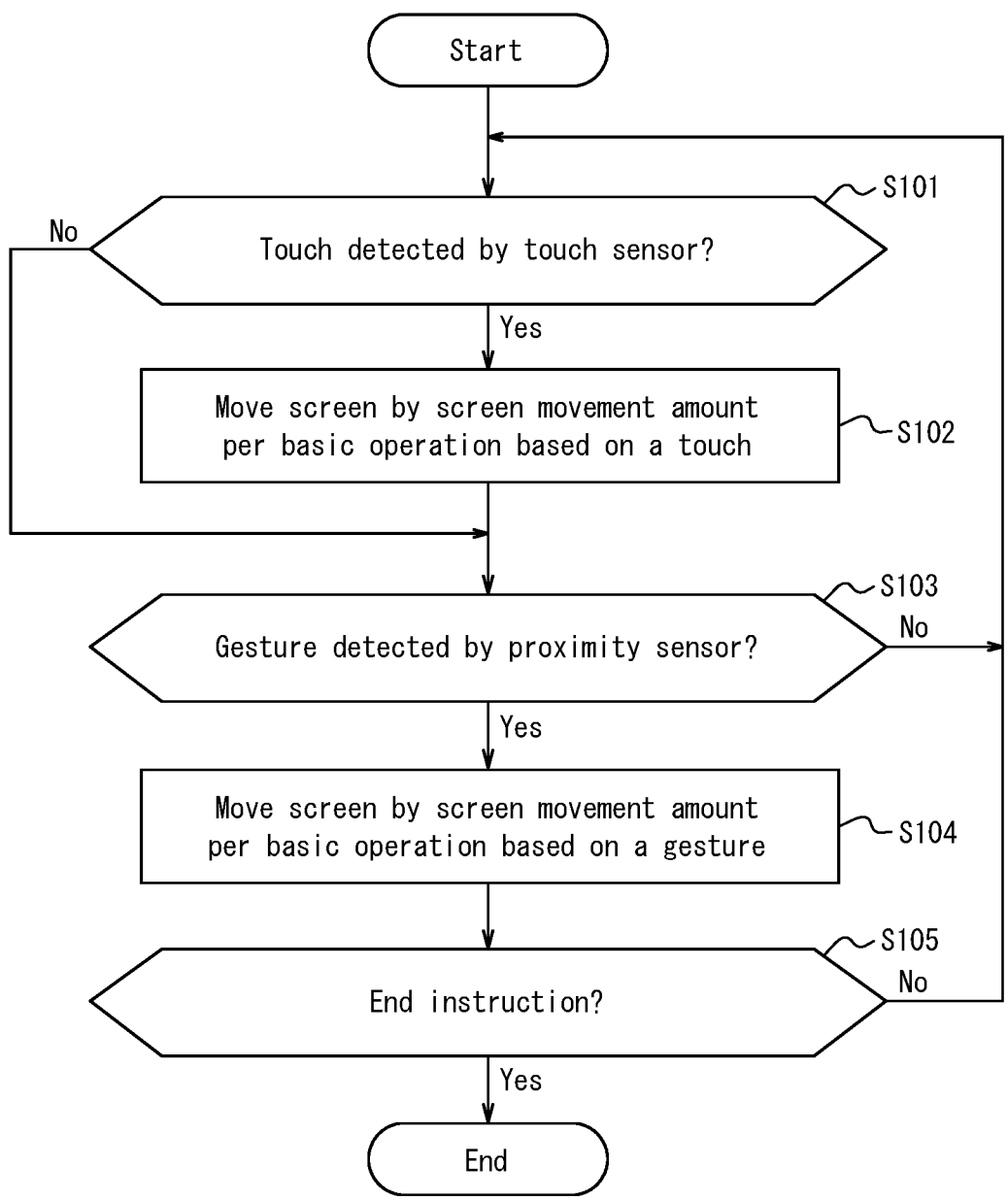
FIG. 27 is a flowchart illustrating an example of processing corresponding to user operation of an electronic device.

FIG. 27 is a flowchart illustrating an example of processing in response to user operation of the electronic device 1 in the aforementioned seventh method.

When a touch is detected by the touch sensor 26 (step S101: Yes), the controller 11 of the electronic device 1 moves the screen by the screen movement amount per basic operation based on a touch (step S102).

When no touch is detected by the touch sensor 26 (step S101: No), or after the processing of step S102, the controller 11 of the electronic device 1 proceeds to the processing of step S103.

When a gesture is detected by the proximity sensor 18 (step S103: Yes), the controller 11 of the electronic device 1 moves the screen by the screen movement amount per basic operation based on a gesture (step S104).

The controller 11 of the electronic device 1 ends the sequence of processing when an end instruction regarding screen movement is received after the processing of step S104 (step S105: Yes).

When a gesture is not detected by the proximity sensor 18 (step S103: No), or when no end instruction regarding screen movement is received (step S105: No), the controller 11 of the electronic device 1 returns to the processing of step S101.

Figure 28:
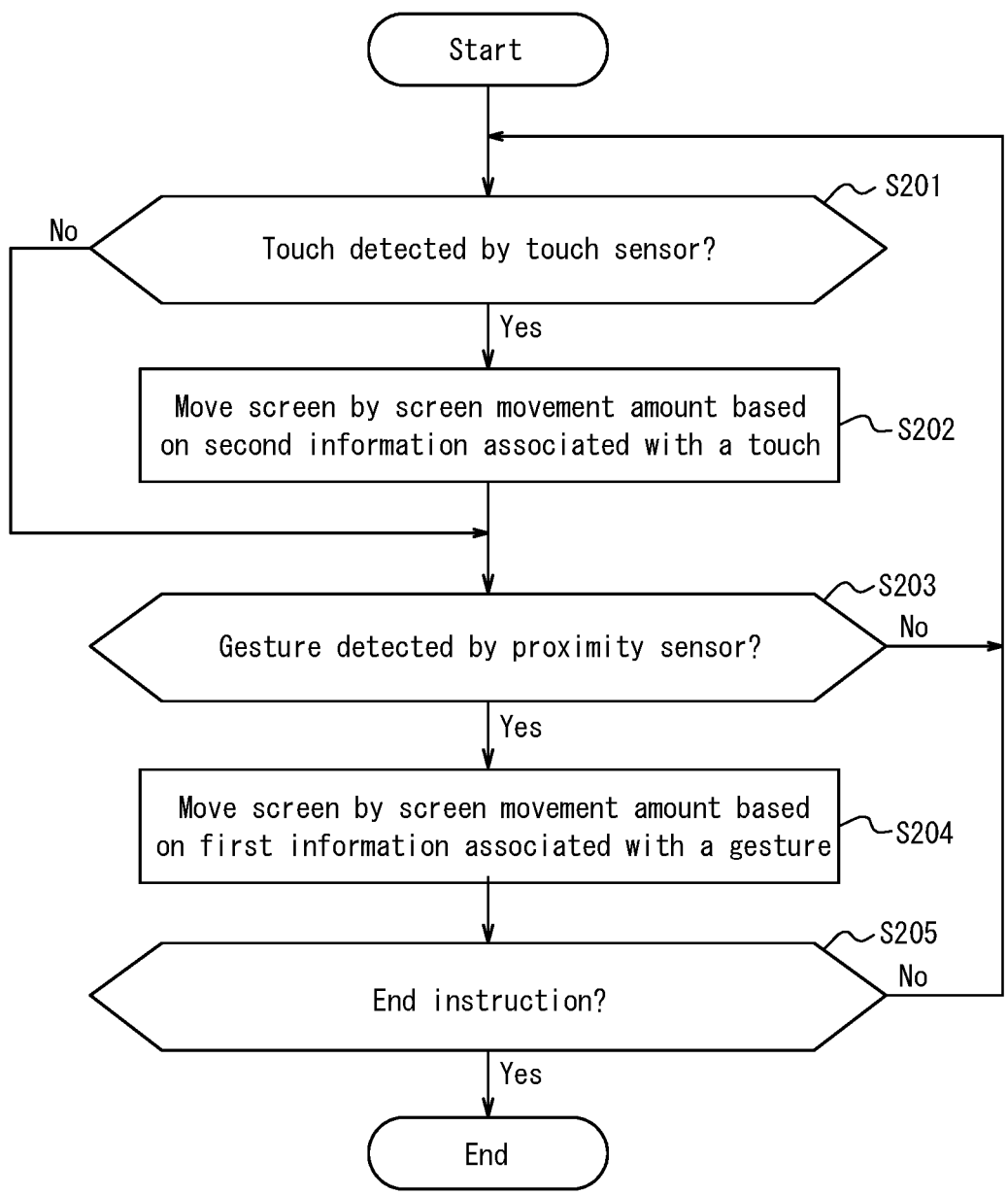
FIG. 28 is a flowchart illustrating an example of processing corresponding to user operation of an electronic device.

FIG. 28 is a flowchart illustrating an example of processing in response to user operation of the electronic device 1 in the aforementioned eighth and ninth methods.

When a touch is detected by the touch sensor 26 (step S201: Yes), the controller 11 of the electronic device 1 moves the screen by the screen movement amount based on second information associated with a touch (step S202).

When no touch is detected by the touch sensor 26 (step S201: No), or after the processing of step S202, the controller 11 of the electronic device 1 proceeds to the processing of step S203.

When a gesture is detected by the proximity sensor 18 (step S203: Yes), the controller 11 of the electronic device 1 moves the screen by the screen movement amount based on first information associated with a gesture (step S204).

The controller 11 of the electronic device 1 ends the sequence of processing when an end instruction regarding screen movement is received after the processing of step S204 (step S205: Yes).

When a gesture is not detected by the proximity sensor 18 (step S203: No), or when no end instruction regarding screen movement is received (step S205: No), the controller 11 of the electronic device 1 returns to the processing of step S201.

In this way, the controller 11 in the electronic device 1 of the present disclosure associates a gesture detected by the proximity sensor 18 and a touch detected by the touch sensor 26 with appropriate operations. The electronic device 1 of the present disclosure thereby has improved operability with regard to input operations.

Other Embodiments

Although the subject matter of the present disclosure has been described with reference to the drawings and embodiments, it is to be noted that various changes and modifications will be apparent to those skilled in the art based on the present disclosure. Therefore, such changes and modifications are to be understood as included within the scope of the present disclosure. For example, the functions and the like included in the various components, steps, and the like may be reordered in any logically consistent way. Furthermore, components, steps, and the like may be combined into one or divided.

For example, the first through ninth methods can be combined. Each of the seventh through the ninth methods, for example, can be combined with the display form of the fifth method that includes a plurality of screens.

The format when a plurality of screens is displayed is not limited to a division of the screen on one display 14, as in the example in FIG. 8. When the electronic device 1 includes one display 14 on the front and one on the back, for example, the first screen 141 may be displayed on the display 14 on the back, and the second screen 142 may be displayed on the display 14 on the front.

In the above embodiment, gestures have been described as being detected by the proximity sensor 18, but gestures do not necessarily have to be detected by the proximity sensor 18. Gestures may be detected by any sensor capable of detecting a gesture by the user without contact on the electronic device 1. Examples of such sensors include the camera 13.

Examples of sensors that can detect a gesture by the user without contact on the electronic device 1 may, for example, include a ranging sensor. For example, the electronic device 1 may include a ranging sensor instead of or in addition to the proximity sensor 18 and may detect a gesture using the ranging sensor.

The ranging sensor is a sensor capable of measuring the distance to an object. The ranging sensor may, for example, be configured as a time of flight (ToF) sensor. The ranging sensor configured as a ToF sensor includes a light emitter that irradiates sinusoidal modulated light (infrared laser light) towards an object and a light receiver that receives reflected light, from the object, of the irradiated infrared laser light. The light receiver includes an image sensor in which a plurality of light-receiving elements are arranged, for example. The ToF sensor measures the time (time-of-flight) from when infrared laser light is irradiated until reflected light is received by the light-receiving elements. The ToF sensor can measure the time-of-flight based on the phase difference between the irradiated infrared laser light and the received reflected light. Based on the measured time-of-flight, the ToF sensor can measure the distance to the object that reflected the irradiated infrared laser light. The ToF sensor can detect the direction of movement of the object from the time difference between when reflected light from the object is incident on each of the light-receiving elements. With a principle similar to the principle described for the proximity sensor 18, the ToF sensor as well can therefore detect a gesture performed by the user. The ranging sensor may be provided on the same surface of the electronic device 1 as the proximity sensor 18, for example.

Figures 29, 30:
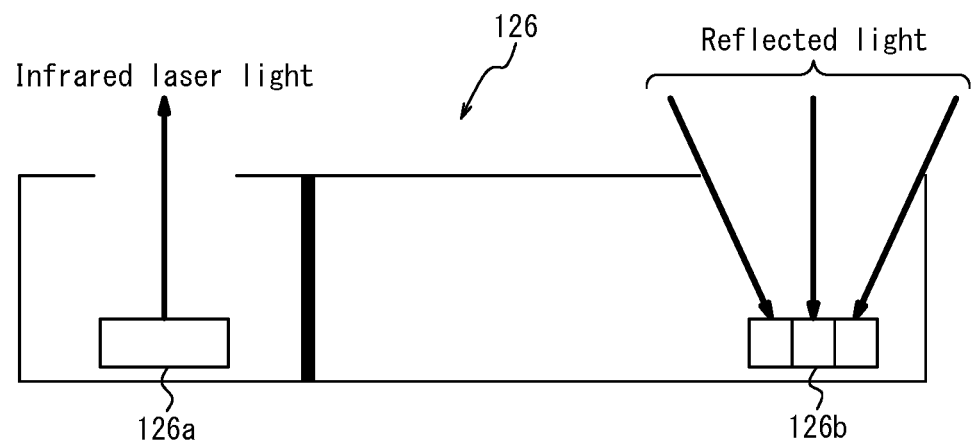
FIG. 29 schematically illustrates a ranging sensor.
FIG. 30 schematically illustrates an example of arrangement of light-receiving elements in the light receiver illustrated in FIG. 29.
Figure 31:
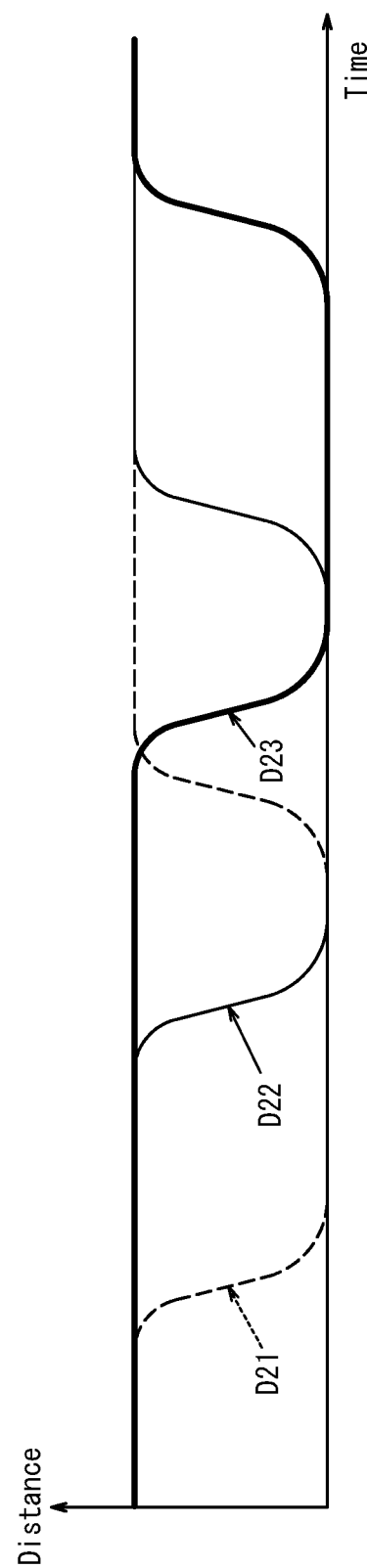
FIG. 31 schematically illustrates the change in distance to an object detected by each light-receiving element.

A method performed by the controller 11 to detect a gesture by the user based on output of the ranging sensor is described below in detail with reference to FIGS. 29 through 31. FIG. 29 schematically illustrates a ranging sensor 126. FIG. 29 is a side view of the ranging sensor 126. The ranging sensor 126 includes a light emitter 126a and a light receiver 126b. The light emitter 126a and the light receiver 126b are arranged to be substantially parallel to the longitudinal direction of the electronic device 1. The light emitter 126a irradiates infrared laser light towards an object. The light receiver 126b receives reflected light, from the object, of the irradiated infrared light.

The light receiver 126b may include a plurality of light-receiving elements. For example, the light receiver 126b may include nine light-receiving elements arranged in a 3×3 grid, as illustrated in FIG. 30. The nine light-receiving elements each receive reflected light from the object. In the light receiver 126b, three light-receiving elements Ch11, Ch12, Ch13 are arranged in order from the left in the upper row in a direction substantially parallel to the transverse direction of the electronic device 1. In the light receiver 126b, three light-receiving elements Ch21, Ch22, Ch23 are arranged in order from the left in the middle row in a direction substantially parallel to the transverse direction of the electronic device 1. In the light receiver 126b, three light-receiving elements Ch31, Ch32, Ch33 are arranged in order from the left in the lower row in a direction substantially parallel to the transverse direction of the electronic device 1.

The ranging sensor 126 can measure the distance to the object from each of the nine light-receiving elements based on the phase difference between the infrared laser light irradiated by the light emitter 126a and the reflected light received by each of the nine light-receiving elements of the light receiver 126b. The ranging sensor 126 can detect a gesture based on the distance from each of the nine light-receiving elements to the object and the change over time in the distance.

For example, suppose that the user performs a gesture to move a hand from left to right. At this time, the distances to the object detected by the light-receiving elements Ch21, Ch22, Ch23 in the middle row are designated as D21, D22, D23. FIG. 31 schematically illustrates the change in distance to the object detected by each light-receiving element. As illustrated schematically in FIG. 31, for example, the hand (object) first approaches the light-receiving element Ch21 located on the left side. The distance D21 to the object detected by the light-receiving element Ch21 therefore decreases. Subsequently, the hand (object) approaches the light-receiving element Ch22 located in the middle, and the distance D22 to the object detected by the light-receiving element Ch22 decreases. Finally, the hand (object) moves to the right, and the distance D23 to the object detected by the light-receiving element Ch23 located on the right side decreases. The order in which the hand that approached the light-receiving elements Ch21, Ch22, Ch23 moves away is also Ch21, Ch22, Ch23. Consequently, the distances D21, D22, D23 increase in this order (and return to their initial values). A gesture in the up or down direction can also be detected by the same principle using the light-receiving elements Ch12, Ch22, Ch32 arranged in the longitudinal direction, for example. The ranging sensor 126 can thus detect a gesture based on the distance from each of the nine light-receiving elements to the object and the change over time in the distance.

The light receiver 126b has been described as including nine light-receiving elements, but the number of light-receiving elements in the light receiver 126b is not limited to this example. The arrangement of the light-receiving elements in FIG. 30 is also not limiting. The number and arrangement of the light-receiving elements in the light receiver 126b may be determined appropriately in accordance with the type of gestures to be detected.

The light emitter 126a of the ranging sensor 126 may include a plurality of light-emitting elements. The light emitter 126a may, for example, include nine light-emitting elements. In this case, the distance to the object from each of the nine light-emitting elements can be measured based on the phase difference between the infrared laser light emitted by each light-emitting element and the reflected light received by the light receiver 126b. By adapting the above-described principle, the ranging sensor 126 can detect a gesture in this case as well based on the distance from each of the nine light-receiving elements to the object and the change over time in the distance.

Much of the subject matter of the present disclosure is described as a series of operations executed by a computer system and other hardware that can execute program instructions. Examples of the computer system and other hardware include a general-purpose computer, a PC, a dedicated computer, and a workstation. Other examples of the computer system and other hardware include a personal communications system (PCS), a mobile (cellular) phone, and a mobile phone with a data processing function. The computer system and other hardware also include an RFID receiver, a game device, an electronic notepad, and a laptop computer. Furthermore, the computer system and other hardware include a global positioning system (GPS) receiver and other programmable data processing apparatuses. It should be noted that in each embodiment, various operations or control methods are, for example, executed by a dedicated circuit (for example, individual logical gates interconnected in order to execute a particular function) implemented by program instructions (software). It should also be noted that in each embodiment, various operations or control methods are, for example, executed by a logical block and/or program module or the like executed by one or more processors. Examples of the one or more processors that execute a logical block and/or program module or the like include one or more microprocessors and CPUs. An application specific integrated circuit (ASIC) and a digital signal processor (DSP) are also included among such processors. A programmable logic device (PLD) and a field programmable gate array (FPGA), for example, are also included among such processors. A controller, a microcontroller, a microprocessor, an electronic device, and others apparatus designed to be capable of executing the functions disclosed herein are also included among such processors. Combinations of the aforementioned examples are also included among such processors. The embodiments disclosed here are, for example, implemented by hardware, software, firmware, middleware, microcode, or a combination of any of these. The instructions may be program code or a code segment for executing the necessary tasks. The instructions may be stored on a machine-readable, non-transitory storage medium or other medium. The code segment may indicate a combination of any of the following: procedures, functions, subprograms, programs, routines, subroutines, modules, software packages, classes, instructions, data structures, or program statements. The code segment may transmit and/or receive information, data arguments, variables, or memory content to or from another code segment or hardware circuit in order for the code segment to connect to another code segment or hardware circuit.

The storage 16 used here may also be configured as a computer-readable, tangible carrier (medium) in any of the categories of solid-state memory, magnetic disks, and optical discs. Data structures or an appropriate set of computer instructions, such as program modules, for causing a processor to execute the techniques disclosed herein are stored on these media. Examples of computer-readable media include an electrical connection with one or more wires, a magnetic disk storage medium, a magnetic cassette, a magnetic tape, or other magnetic storage media. Optical storage media such as a Compact Disc (CD) or a laser Disc® (laser disc is a registered trademark in Japan, other countries, or both) are also included among computer-readable media. A Digital Versatile Disc (DVD®), Floppy® disk, and Blu-ray Disc® (DVD, floppy, and Blu-ray Disc are registered trademarks in Japan, other countries, or both) are also included among computer-readable media. A portable computer disk, random access memory (RAM), and read-only memory (ROM) are also included among computer-readable media. Erasable programmable read-only memory (EPROM) is also included among computer-readable media. Electrically erasable programmable read-only memory (EEPROM) is also included among computer-readable media. Rewritable programmable ROM such as flash memory, another tangible storage medium that can store information, and a combination of any of the aforementioned examples are also included among computer-readable media. The memory may be provided internal and/or external to a processor or processing unit. As used in the present disclosure, the term "memory" refers to all types of long-term storage, short-term storage, and volatile, non-volatile, or other memory. In other words, the "memory" is not limited to a particular type and/or number. The type of medium on which information is stored is not limited, either.

REFERENCE SIGNS LIST

1 Electronic device
11 Controller
12 Timer
13 Camera
14 Display
15 Microphone
16 Storage
17 Communication interface
18 Proximity sensor
19 UV sensor
20 Illuminance sensor
21 Acceleration sensor
22 Geomagnetic sensor
23 Barometric pressure sensor
24 Gyro sensor
25 Speaker
26 Touch sensor
30 Icon
31 Thumbnail
126 Ranging Sensor
126a Optical emitter
126b Optical detector
141 First screen
142 Second screen
143 Third screen
180 Infrared LED used as light source
181 Lens
SU, SR, SD, SL Photodiode

The invention claimed is:

1. An electronic device comprising:
a sensor configured to detect a gesture that does not come into contact with the electronic device;
a touch sensor;
a display configured to display a first screen displaying a first application and a second screen displaying a second application, the second application being different than the first application; and
a controller configured to associate the gesture detected by the sensor with an operation of the first screen displaying the first application and a touch detected by the touch sensor with an operation of the second screen displaying the second application in accordance with a position where the sensor is disposed,
wherein the controller is configured to allow a user of the electronic device to select a first method in which a gesture is associated with an operation of the first screen that is closer to a position where the sensor is disposed than the second screen, or a second method in which a gesture is associated with an operation of the first screen that is farther from a position where the sensor is disposed than the second screen.

2. The electronic device of claim 1, wherein the controller is configured to associate the touch further with at least one of an inter-screen operation and a screen erase operation.

3. The electronic device of claim 1, wherein the controller is configured to associate a particular type of touch with a particular operation of the second screen; and associate a particular type of gesture with a particular operation of the first screen.

4. The electronic device of claim 1, wherein, when the first screen is set to be an active window, the controller is configured to associate a particular type of gesture with a display of a list of setting items of the active window.

5. An electronic device comprising: a sensor configured to detect a gesture that does not come into contact with the electronic device; a touch sensor; and a controller configured to set a screen movement amount per basic operation based on the gesture detected by the sensor to be greater than a screen movement amount per basic operation based on a touch detected by the touch sensor and configured to disable the gesture operation when an amount of data to be moved is less than an movement amount of the gesture, wherein the disabling of the gesture operation is to turn the sensor off.

* * * * *